(12) United States Patent
Tarelli et al.

(10) Patent No.: US 11,539,279 B2
(45) Date of Patent: Dec. 27, 2022

(54) GAP-CLOSING ACTUATOR HAVING A DOUBLE-WOUND DRIVING COIL

(71) Applicant: Apple Inc., Cupertino, CA (US)

(72) Inventors: Riccardo Tarelli, San Francisco, CA (US); Yumeng Liu, Sunnyvale, CA (US)

(73) Assignee: Apple Inc., Cupertino, CA (US)

(*) Notice: Subject to any disclaimer, the term of this patent is extended or adjusted under 35 U.S.C. 154(b) by 251 days.

(21) Appl. No.: 16/900,744

(22) Filed: Jun. 12, 2020

(65) Prior Publication Data
US 2021/0099062 A1 Apr. 1, 2021

Related U.S. Application Data

(60) Provisional application No. 62/907,526, filed on Sep. 27, 2019.

(51) Int. Cl.
| | | |
|---|---|---|
| *H02K 33/12* | (2006.01) | |
| *H02P 7/02* | (2016.01) | |
| *H02P 23/14* | (2006.01) | |
| *H02P 25/032* | (2016.01) | |
| *H02P 25/22* | (2006.01) | |
| *B06B 1/04* | (2006.01) | |

(52) U.S. Cl.
CPC .............. *H02K 33/12* (2013.01); *H02P 7/02* (2016.02); *H02P 23/14* (2013.01); *H02P 25/032* (2016.02); *H02P 25/22* (2013.01); *B06B 1/045* (2013.01); *H02P 2203/01* (2013.01)

(58) Field of Classification Search
CPC . H02K 33/12; H02P 7/02; H02P 23/14; H02P 25/032; H02P 25/22
USPC ................................................. 318/119, 122
See application file for complete search history.

(56) References Cited

U.S. PATENT DOCUMENTS

| | | |
|---|---|---|
| 8,232,969 B2 | 7/2012 | Grant et al. |
| 9,436,341 B2 | 9/2016 | Ponziani |
| 10,185,397 B2 | 1/2019 | Yoneoka et al. |
| 10,298,163 B2* | 5/2019 | Vasilev ............... G08B 6/00 |
| 10,409,379 B1 | 9/2019 | Khoshkava et al. |
| 2018/0090253 A1 | 3/2018 | Songatikamas |

* cited by examiner

*Primary Examiner* — David Luo
(74) *Attorney, Agent, or Firm* — Fish & Richardson P.C.

(57) ABSTRACT

A haptic engine includes a gap-closing actuator having a double-wound driving coil in which the two windings can be activated with two driving sources, respectively. Or, the two windings double-wound driving coil can be activated with a single driving source when the two windings are connected with each other either in series or in parallel. By using the double-wound driving coil in the gap-closing actuator as described, an instant inductance of either of the two windings can be determined without having to measure in real time a resistance of the corresponding winding.

45 Claims, 10 Drawing Sheets

GAP-CLOSING ACTUATOR HAVING A DOUBLE-WOUND DRIVING COIL

CROSS-REFERENCE TO RELATED APPLICATIONS

This application claims the benefit of priority of U.S. Provisional Patent Application No. 62/907,526, filed Sep. 27, 2019, which provisional patent application is incorporated by reference herein in its entirety.

BACKGROUND

Technical Field

This specification relates generally to haptic engine architectures, and more specifically, to a haptic engine having a gap-closing actuator, referred to interchangeably as a reluctance motor, in which position of the actuator's moving mass is sensed, independently of temperature, by using the actuator's double-wound driving coil.

BACKGROUND

A haptic engine (also referred to as a vibration module) includes a haptic actuator in which a mass is driven using electromagnetic forces to move relative the haptic actuator's frame, at least, along a driving direction (e.g., through vibration back-and-forth along the driving direction). A haptic actuator can be implemented as a linear resonant actuator (LRA), a gap-closing actuator, a rotary actuator, a reluctance motor, etc. The haptic engine also includes circuitry for actuating the haptic actuator, e.g., to produce the electromagnetic forces responsible for moving the mass, and circuitry for determining one or more of acceleration, velocity and displacement of the moving mass.

FIGS. 7-8 show aspects of dynamics of a mass M of a gap-closing actuator. As shown in FIG. 7, the gap-closing actuator is represented as a combination of an electromagnetic system and a mechanical system that are coupled with each other. In this example, the electromagnetic system includes a stator that has a coil with an inductance L and a cross section $A_C$. Here, the stator is at rest relative a datum of the mechanical system. The electromagnetic system also includes a ferromagnetic rotor that has a mass M, and that is spaced apart by a gap g from the coil. The rotor, referred to interchangeably as attraction plate, is also part of the mechanical system. The attraction plate is movably coupled with the datum through a coupler that has a spring constant $K_S$ and a damping coefficient b. In general, the attraction plate can be on either top, as shown in FIG. 7, or bottom, or either one side or both sides of the coil. Also, in general, multiple coil-attraction plate pairs can be used in a gap-closing actuator.

Referring again to the example of a gap-closing actuator illustrated in FIG. 7, magnetic-flux dynamics of the electromagnetic system are coupled with spring-dampener dynamics of the mechanical system in the following manner. When an AC current I is driven through the coil, a magnetic flux $\lambda=LI$ is induced in the attraction plate, which in turn induces a driving force that moves the attraction plate to cyclically open and close the gap between the coil and the attraction plate. Here, L is the inductance of the coil. The coupler opposes the driving force and, thus, limits the range of the gap g. In this manner, the gap between the coil and the attraction plate of the reluctance motor varies in accordance with the following equation of motion:

$$\frac{d^2 g(t)}{dt^2} = -\frac{b}{M}\frac{dg(t)}{dt} - \frac{K_S}{M}g + \left(\frac{g_0 K_S}{M} - \frac{\lambda^2}{2\mu_0 M n^2 A_C}\right). \quad (1)$$

In EQ. (1), $\mu_0$ is the permeability of the medium between the attraction plate and the coil, and n is the number of turns of the coil. Here, the "driving" term is a function of the magnetic flux $\mu=LI$ produced by the coil through the attraction plate in the following manner:

$$F = \frac{\lambda^2}{2\mu_0 n^2 A_C} \quad (2)$$

$$= \frac{\mu_0 n^2 A_C}{2}\left(\frac{I}{g}\right)^2$$

$$= \frac{1}{2\mu_0 n^2 A_C}(LI)^2.$$

In view of EQ. (2), the coil inductance L can be expressed as a ratio of a product of multiple parameters $\mu_0 n^2 A_C$, and the gap g:

$$L = \frac{\mu_0 n^2 A_C}{g}. \quad (3)$$

Thus, the gap between the coil and the attraction plate of the reluctance motor can be determined, based on EQ. (3), by calibrating the coil parameters n and $A_C$, and determining the coil inductance L.

An equivalent electrical circuit of the gap-closing actuator is shown schematically in FIG. 8. The equivalent electrical circuit includes the coil, and a driving source to provide a driving voltage V. Here, the coil has a resistance R and an inductance L connected in series with the driving source. Ohm's law for this equivalent electric circuit at a time instance is:

$$\frac{d\lambda(t)}{dt} = -\frac{R}{L}\lambda(t) + V_{drive}. \quad (4)$$

In accordance with EQ. (4), the driving source induces a current $$I = \frac{\lambda}{L}$$

through the coil. Here, the electrical circuit dynamics converge to first order dynamics under the assumption that the inductance L is relatively invariant during a click displacement, i.e., the term $$\frac{dL(t)}{dt} = 0.$$

term This assumption is true when a "click displacement" is much shorter than the gap g. Under such assumptions, the coil inductance L can be obtained by sensing the voltage $V_{drive}$ across the coil, and the current I induced through the coil, as $$L = -\frac{V_{drive} - RI(t)}{\frac{dI}{dt}}. \quad (5)$$

Note that using this approach, the coil inductance L sensing requires a-priori knowledge of the resistance of the coil under measurement.

Further note that most efficient actuators have a small gap g. Thus, the foregoing assumption relating to the relative size of the click displacement may be invalid, because the click displacement can be only slightly shorter than the gap g itself. For these efficient actuators, the coil inductance L changes during operation, in accordance with EQ. (3) because of the gap closing, such that, in EQ (4), the term $$\frac{dL(t)}{dt} \neq 0,$$

because g(t)¿0.

Additionally, the coil resistance R also changes during operation especially because of thermal effects. The coil resistance knowledge is usually achieved through factory calibration. However, factory calibration is sensitive to any changes happening during product lifetime, including temperature variations. For instance, the actual value of R is typically sensitive to the thermal effects caused by large driving currents during actuation. For copper coils, temperature variation can cause a resistance delta of ~0.4%/degC, which would lead to an unusable measurement within a few degC variation from factory temperature.

Several solutions have been conventionally implemented to mitigate errors in obtaining the coil inductance L due to the noted temperature variations of the coil resistance. One solution makes use of an external temperature sensor to track coil temperature. However, coil temperature can be very difficult to track in real-time, i.e., with low latency, due to heat transfer time constant and losses between coil and sensor. Also, this solution relies on a precise knowledge of the coil temperature coefficient.

Another solution makes use of real-time impedance measurement tone. Here, a single tone signal is added on top of a haptic-intended playback, and the coil resistance R and the coil induction L are extracted from fft(V)/fft(I) at that frequency. A few drawbacks for this solution are enumerated below. With a conventional audio amplifier-sampling rate (48-96 kHz), the measurement needs long settling time to achieve good signal-to-noise ratio (SNR). Also, the tone is likely to be in the audible range, causing an undesirable audible tone during the playback. Finally, the resistance estimation tone will also increase power consumption without any force increase to the desired haptic playback.

SUMMARY

In accordance with the disclosed technologies, a haptic engine includes a gap-closing actuator having a double-wound driving coil. The two windings are activated independently using respective drivers. Or, the two windings are activated by a single driver, which activates the two windings connected to the driver either in series or in parallel. By using the disclosed double-wound driving coil, instant inductances of the two windings can be determined without having to measure in real time resistances of the corresponding windings.

In general, one innovative aspect of the subject matter described in this specification can be embodied in a haptic engine that includes a frame; a first coil and a second coil wound together around a common core, the first coil and the second coil being thermally coupled with each other and mechanically coupled with the frame, the first coil having first terminals and the second coil having second terminals; first driver circuitry electrically coupled with the first coil at the first terminals to drive a first driving current through the first coil; first voltage- and current-sensing circuitry electrically coupled with the first coil at the first terminals to sense a first driving voltage across, and the first driving current through, the first coil; second driver circuitry electrically coupled with the second coil at the second terminals to drive a second driving current through the second coil. Here, the first driving current and the second driving current have different values, and an increase of the first current is different from a decrease of the second current. The haptic engine further includes second voltage- and current-sensing circuitry electrically coupled with the second coil at the second terminals to sense a second driving voltage across, and the second driving current through, the second coil; an attraction plate spaced apart from the first and the second coils through a gap, the attraction plate arranged to be driven relative to the frame along a driving direction to cause variation of the gap when the first driving current is driven through the first coil, and the second driving current is driven through the second coil; and computing circuitry configured to determine values of the gap between the attraction plate and the first and the second coils. Here, the gap values are determined independently of resistances of either the first coil or the second coil, and dependently of the first driving current through, and the first driving voltage across, the first coil, and the second driving current through, and the second driving voltage across, the second coil, and the rates of change of the first and second driving currents.

Other embodiments of this aspect include corresponding computing devices, each configured to perform operations or actions based on signals output by the disclosed haptic engine. For a device to be configured to perform particular operations or actions means that the device has installed on it software, firmware, hardware, or a combination of them that in operation cause the device to perform the operations or actions.

The foregoing and other embodiments can each optionally include one or more of the following features, alone or in combination. In particular, one implementation includes all the following features in combination. In some implementations, to determine the gap, the computing circuitry is configured to compute a first inductance of the first coil or a second inductance of the second coil. Here, each of the first inductance and the second inductance is computed independently of resistances of either the first coil or the second coil, and dependently of the first driving current through, and the first driving voltage over, the first coil, and the second driving current through, and the second driving voltage over, the second coil, and the rates of change of the first and second driving currents. Additionally, the computing circuitry is configured to invert the first inductance of the first coil, or the second inductance of the second coil.

In some implementations, the first driver circuitry and the second driver circuitry are configured to drive the first driving current through the first coil and the second driving current through the second coil with frequencies in a frequency range of 10 Hz to 5 kHz, preferably 300 Hz to 1 kHz. In some implementations, the first driver circuitry and the second driver circuitry can be synchronized to drive the first driving current through the first coil and the second driving current through the second coil with the same frequency, and (i) when first and second coils are wound in the same direction, in phase relative to each other, or (ii) when first and second coils are wound in opposite directions, 180°-out-of-phase relative to each other.

In some implementations, the haptic engine can include an integrated circuit that includes (i) the first driver circuitry comprising a first driving-current source to supply the first driving current through the first coil, (ii) the first voltage and current sensing circuitry comprising a first voltage sensor and a first current sensor to sense respective values of the first driving voltage across, and the first driving current through, the first coil, (iii) the second driver circuitry comprising a second driving-current source to supply the second driving current through the second coil, and (iv) the second voltage and current sensing circuitry comprising a second voltage sensor and a second current sensor to sense respective values of the second driving voltage across, and the second driving current through, the second coil.

In some implementations, the haptic engine can include an integrated circuit that includes (i) the first driver circuitry comprising a first driving-voltage source to supply a first driving voltage across the first coil to induce the first driving current through the first coil, (ii) the first voltage and current sensing circuitry comprising a first voltage sensor and a first current sensor to sense respective values of the first driving voltage across, and the first driving current through, the first coil, (iii) the second driver circuitry comprising a second driving-voltage source to supply a second driving voltage across the second coil to induce the second driving current through the second coil, and (iv) the second voltage and current sensing circuitry comprising a second voltage sensor and a second current sensor to sense respective values of the second driving voltage across, and the second driving current through, the second coil. In some cases, the computing circuitry can be coupled with (i) the first voltage/current sensing circuitry to receive respective values of the first driving voltage across, and the first driving current through, the first coil, and (ii) the second voltage/current sensing circuitry to receive respective values of the second driving voltage across, and the second driving current through, the second coil. In some cases, the integrated circuit can be disposed either inside or outside the frame. In some cases, the computing circuitry can be disposed either inside or outside the frame.

In some implementations, a device can include a haptic interface; any one of the foregoing implementations of the haptic engine coupled with the haptic interface; and a controller coupled with the computing circuitry, the first driver circuitry, and the second driver circuitry. The controller is configured to (i) receive values of the gap computed by the computing circuitry, (ii) receive or access a target value of the gap, and (iii) cause, based on a comparison of the computed and target values of the gap, adjustments of the first driving current driven by the first driver circuitry to the first coil, and adjustments of the second driving current driven by the second driver circuitry to the second coil. In some cases, the device can be any one of a smartphone, a tablet, a laptop or a watch.

Another innovative aspect of the subject matter described in this specification can be embodied in a method for determining inductance of each winding of a coil with two windings wound together around a common core. The method includes driving a first current through a first of the two windings; and driving a second current through a second of the two windings. The second current is different than the first current, and an increase of the first current is different from a decrease of the second current; the method further includes sensing a first voltage across, and the first current through, the first winding; sensing a second voltage across, and the second current through, the second winding; and computing a first inductance the first winding or a second inductance of the second winding. Here, each of the first inductance and the second inductance is computed independently of resistances of either the first winding or the second winding, and dependently of the first current through, and the first voltage over, the first winding, and the second current through, and the second voltage over, the second winding, and the rates of change of the first and second currents.

Other embodiments of this aspect include corresponding computing devices, each configured to perform operations or actions based on signals output by the disclosed haptic engine.

The foregoing and other embodiments can each optionally include one or more of the following features, alone or in combination. In particular, one implementation includes all the following features in combination. In some implementations, driving the first current through the first of the two windings can include supplying the first voltage across the first winding to induce the first current through the first winding, and driving the second current through the second of the two windings can include supplying the second voltage across the second winding to induce the second current through the second winding. In some implementations, driving the first current through the first of the two windings comprises supplying the first current through the first winding, and driving the second current through the second of the two windings comprises supplying the second current through the second winding.

In some implementations, the method can include, when the first winding and the second winding are identical, computing the first inductance or the second inductance, in accordance with the following expression:

$$L_1 = L_2 = \frac{V_{drive_1} I_2 - V_{drive_2} I_1}{(I_2 - I_1)\left(\frac{dI_1}{dt} + \frac{dI_2}{dt}\right)}.$$

In some implementations, the first current through the first winding and the second current through the second winding can be driven with frequencies in a frequency range of 10 Hz to 5 kHz, preferably 300 Hz to 1 kHz. In some implementations, the method can include synchronizing the driving of the first current through the first winding and the second current through the second winding, such that the first current and the second current are driven with the same frequency and (i) when first and second coils are wound in the same direction, in phase relative to each other, or (ii) when first and second coils are wound in opposite directions, 180°-out-of-phase relative to each other.

Another innovative aspect of the subject matter described in this specification can be embodied in a haptic engine that includes a frame; a double-wound driving coil that is mechanically coupled with the frame and comprises a first coil and a second coil wound together around a common core and thermally coupled with each other, the first coil and the second coil being connected in series and having a common terminal, wherein a first ratio $$N = \frac{R_1}{R_2}$$

of the resistances of the first coil and the second coil is different from the square root of a second ratio $$M = \frac{L_1}{L_2}$$

of the inductances of the first coil and the second coil; driver circuitry electrically coupled with the first coil at a first terminal different from the common terminal, and the second coil at a second terminal different from the common terminal to drive a driving current through the first coil and the second coil, such that its rate of change is non-zero; first voltage sensing circuitry to sense a first driving voltage across the first coil when electrically coupled with the first coil at the first terminal and the common terminal; second voltage sensing circuitry to sense a second driving voltage across the second coil when electrically coupled with the second coil at the second terminal and the common terminal; an attraction plate spaced apart from the first and the second coils through a gap, the attraction plate arranged to be driven relative to the frame along a driving direction to cause variation of the gap when the driving current is driven through the first coil and the second coil; and computing circuitry configured to determine values of the gap between the attraction plate and the first and the second coils, the gap values determined independently of resistances of either the first coil or the second coil, and dependently of the first driving voltage over the first coil and the second driving voltage over the second coil, the rate of change of the driving current through the first and second coils, and the first and second ratios.

Other embodiments of this aspect include corresponding computing devices, each configured to perform operations or actions based on signals output by the disclosed haptic engine. For a device to be configured to perform particular operations or actions means that the device has installed on it software, firmware, hardware, or a combination of them that in operation cause the device to perform the operations or actions.

The foregoing and other embodiments can each optionally include one or more of the following features, alone or in combination. In particular, one implementation includes all the following features in combination. In some implementations, the first coil and the second coil have the same numbers of turns and different resistances. In some implementations, the first coil and the second coil have the same coil geometry, and are made from wire of the same material, and the first coil has a first gauge, and the second coil has a second gauge different from the first gauge. In some implementations, the first coil and the second coil have the same coil geometry and the same gauge, and the first coil is made from a first material, and the second coil is made from a second material different from the first material. In some implementations, to determine the gap, the computing circuitry is configured to (i) compute a first inductance of the first coil or a second inductance of the second coil. Each of the first inductance and the second inductance is computed independently of resistances of either the first coil or the second coil, and dependently of the first driving voltage over the first coil, and the second driving voltage over the second coil, the rate of change of the driving current, and the first and second ratios; and (ii) invert the first inductance of the first coil, or the second inductance of the second coil.

In some implementations, the driver circuitry is configured to drive the driving current through the first coil and the second coil with frequencies in a frequency range of 10 Hz to 5 kHz, preferably 300 Hz to 1 kHz.

In some implementations, the haptic engine can include an integrated circuit which includes the driver circuitry including (i) a driving-current source to supply the driving current through the first coil and the second coil, and a current sensor to sense the driving current, (ii) the first voltage sensing circuitry comprising a first voltage sensor, and (iii) the second voltage sensing circuitry comprising a second voltage sensor.

In some implementations, the haptic engine can include an integrated circuit can include the driver circuitry including a driving-voltage source to supply a driving voltage across the first coil and the second coil to induce the driving current through the first coil and the second coil, and a current sensor to sense the driving current. In some cases, the integrated circuit can be disposed either inside or outside the frame. In some cases, the computing circuitry can be disposed either inside or outside the frame.

In some implementations, the computing circuitry is coupled with the first sensing circuitry to receive values of the first driving voltage across the first coil sensed by the first voltage sensing circuitry, and the second sensing circuitry to receive values of the second driving voltage across the second coil sensed by the second voltage sensing circuitry.

In some implementations, a device can include a haptic interface; any one of the foregoing implementations of the haptic engine coupled with the haptic interface; and a controller coupled with the computing circuitry and the driver circuitry. Here, the controller is configured to (i) receive values of the gap computed by the computing circuitry, (ii) receive or access a target value of the gap, and (iii) cause, based on a comparison of the computed and target values of the gap, current adjustments of the driving current supplied by the driver circuitry to the first coil and the second coil or voltage adjustments of the driving voltage supplied by the driver circuitry across the series-connected first and second coils. Here, the device can be any one of a smartphone, a tablet, a laptop or a watch.

Another innovative aspect of the subject matter described in this specification can be embodied in a method for determining inductance of each winding of a coil with two windings wound together around a common core, the two windings connected in series, wherein a first ratio $$N = \frac{R_1}{R_2}$$

of the resistances of a first of the two windings and second of the two windings is different from the square root of a second ratio $$M = \frac{L_1}{L_2}$$

of the inductances of the two windings. The method includes driving a current through the two windings, such that its rate of change is non-zero; sensing the current through the two windings; sensing a first voltage across the first winding;

sensing a second voltage across the second winding; and computing a first inductance of the first winding or a second inductance of the second winding. Here, each of the first inductance and the second inductance is computed independently of resistances of either the first winding or the second winding, and dependently of the first driving voltage over the first winding and the second driving voltage over the second winding, the rate of change of the driving current through the two windings, and the first and second ratios.

Other embodiments of this aspect include corresponding computing devices, each configured to perform operations or actions based on signals output by the disclosed haptic engine.

The foregoing and other embodiments can each optionally include one or more of the following features, alone or in combination. In particular, one implementation includes all the following features in combination. In some implementations, driving the current through the two windings can include supplying a driving voltage across the two windings. In some implementations, driving the current through the two windings can include supplying the current through the two windings.

In some implementations, computing the first inductance or the second inductance is performed in accordance with the following expressions:

$$L_2 = \frac{NV_{drive_2} - V_{drive_1}}{(N - \sqrt{M})(1 + \sqrt{M})\frac{dI}{dt}}, \text{ and}$$

$$L_1 = ML_2.$$

In some implementations, computing the first inductance or the second inductance, when the first coil and the second coil have the same numbers of turns and different resistances, is performed in accordance with the following expressions:

$$L_1 = L_2 = \frac{NV_{drive_2} - V_{drive_1}}{2(N-1)\frac{dI}{dt}}.$$

In some implementations, the current through the two windings can be driven with frequencies in a frequency range of 10 Hz to 5 kHz, preferably 300 Hz to 1 kHz.

Another innovative aspect of the subject matter described in this specification can be embodied in a haptic engine that includes a frame; a double-wound driving coil that is mechanically coupled with the frame and comprises a first coil and a second coil wound together around a common core and thermally coupled with each other, the first coil and the second coil being connected in parallel at common terminals; voltage-driver circuitry electrically coupled with the parallel-connected first coil and second coil to drive a driving voltage across the parallel-connected first coil and second coil. The voltage driver circuitry includes a voltage sensor electrically coupled with the parallel-connected first coil and second coil to sense the driving voltage across the parallel-connected first coil and second coil; the haptic engine further includes first current sensing circuitry electrically coupled with the first coil to sense a first driving current caused through the first coil by the driving voltage; second current sensing circuitry electrically coupled with the second coil to sense a second driving current caused through the second coil by the driving voltage. A first ratio $$\frac{I_1}{I_2}$$

of the first and second driving currents is different from a ratio of square root of a second ratio $$M = \frac{L_1}{L_2}$$

of the inductances of the first winding and the second winding and a third ratio $$N = \frac{R_1}{R_2}$$

of the resistances of me first winding and the second winding. And an increase of the first current scaled by the square root of the first ratio is different from a decrease of the second current. The haptic engine further includes an attraction plate spaced apart from the first and the second coils through a gap, the attraction plate arranged to be driven relative to the frame along a driving direction to cause variation of the gap when the driving voltage is supplied across the parallel-coupled first coil and the second coil; and computing circuitry configured to determine a velocity of the mass along the driving direction. Here, the velocity is determined independently of resistances of either the first coil or the second coil, and dependently of the values of the driving voltage, the rates of change of the first and second driving currents, and the first, second, and third ratios.

Other embodiments of this aspect include corresponding computing devices, each configured to perform operations or actions based on signals output by the disclosed haptic engine. For a device to be configured to perform particular operations or actions means that the device has installed on it software, firmware, hardware, or a combination of them that in operation cause the device to perform the operations or actions.

The foregoing and other embodiments can each optionally include one or more of the following features, alone or in combination. In particular, one implementation includes all the following features in combination. In some implementations, the first coil and the second coil have the same numbers of turns and different resistances. In some implementations, the first coil and the second coil have the same coil geometry, and are made from wire of the same material, and the first coil has a first gauge, and the second coil has a second gauge different from the first gauge. In some implementations, the first coil and the second coil have the same coil geometry and the same gauge, and the first coil is made from a first material, and the second coil is made from a second material different from the first material.

In some implementations, to determine the gap, the computing circuitry is configured to (i) compute a first inductance of the first coil or a second inductance of the second coil. Here, each of the first inductance and the second inductance is computed independently of resistances of either the first coil or the second coil, and dependently of the values of the driving voltage, the rates of change of the first and second driving currents, and the first, second, and third ratios; and (ii) invert the first inductance of the first coil, or the second inductance of the second coil.

In some implementations, the voltage-driver circuitry is configured to drive the driving voltage across the parallel-connected first coil and second coil with frequencies in a frequency range of 10 Hz to 5 kHz, preferably 300 Hz to 1 kHz.

In some implementations, the haptic engine can include an integrated circuit that can include (i) the voltage-driver circuitry comprising a driving-voltage source to supply the driving voltage across the parallel-connected first coil and second coil, (ii) the first sensing circuitry comprising a first current sensor, and (iii) the second sensing circuitry comprising a second current sensor. In some cases, the computing circuitry can be coupled with the voltage sensor to receive values of the driving voltage across the parallel-connected first coil and second coil, the first current sensing circuitry to receive values of the first driving current through the first coil sensed by the first current sensor, and the second current sensing circuitry to receive values of the second driving current through the second coil sensed by the second current sensor. In some cases, the integrated circuit can be disposed either inside or outside the frame. In some cases, the computing circuitry can be disposed either inside or outside the frame.

In some implementations, a device can include a haptic interface; the foregoing haptic engine coupled with the haptic interface; and a controller coupled with the computing circuitry and the voltage driver circuitry. Here, the controller is configured to (i) receive values of the gap computed by the computing circuitry, (ii) receive or access a target value of the gap, and (iii) cause, based on a comparison of the computed and target values of the gap, voltage adjustments of the driving voltage supplied by the driving-voltage source across the parallel-connected first coil and second coil. In some cases, the device can be any one of a smartphone, a tablet, a laptop or a watch.

Another innovative aspect of the subject matter described in this specification can be embodied in a method for determining inductance of each winding of a coil with two windings wound together around a common core, the two windings being connected in parallel. The method includes supplying a driving voltage across the two parallel-connected windings; sensing the driving voltage; sensing a first current through the first winding; and sensing a second current through the second winding. Here, (i) a first ratio $$\frac{I_1}{I_2}$$

of the and second driving currents is different from a ratio of square root of a second ratio $$M = \frac{L_1}{L_2}$$

of the inductances of the first winding and the second winding and a third ratio $$N = \frac{R_1}{R_2}$$

of the resistances of the first winding and the second winding, and (ii) an increase of the first current scaled by the square root of the first ratio is different from a decrease of the second current. Additionally, the method includes computing a first inductance of the first winding or a second inductance of the second winding. Here, each of the first inductance and the second inductance is computed independently of resistances of either the first winding or the second winding, and dependently of the values of the driving voltage, the rates of change of the first and second driving currents, and the first, second, and third ratios.

Other embodiments of this aspect include corresponding computing devices, each configured to perform operations or actions based on signals output by the disclosed haptic engine.

The foregoing and other embodiments can each optionally include one or more of the following features, alone or in combination. In particular, one implementation includes all the following features in combination. In some implementations, computing the first inductance or the second inductance is performed in accordance with the following expressions:

$$L_2 = \frac{V_{drive}\left(1 - N\frac{I_1}{I_2}\right)}{\left(\frac{dI_2}{dt} + \sqrt{M}\frac{dI_1}{dt}\right)\left(\sqrt{M} - N\frac{I_1}{I_2}\right)}, \text{ and}$$

$$L_1 = M L_2.$$

In some implementations, the driving voltage across the two parallel-connected windings can be supplied with frequencies in a frequency range of 10 Hz to 5 kHz, preferably 300 Hz to 1 kHz.

The subject matter described in this specification can be implemented in particular embodiments so as to realize one or more of the following advantages. For example, values of the inductances of the gap-closing actuator's double-wound driving coil, and/or values of the gap between the gap-closing actuator's rotor and double-wound driving coil are independent of the double-wound driving coil's resistance value(s). As such, the disclosed technologies are robust against temperature variations, while reducing or eliminating accuracy requirements for factory resistance calibration.

Further, in accordance with the disclosed technologies, there is no need for real-time resistance measurements and inductance measurements, which leads to eliminating settling time associated with these measurements. Furthermore, the need to add an extra tone to playback is avoided by using the disclosed technologies, which leads to eliminating additional acoustic noise and power consumption associated with such a conventional approach of adding an extra tone to playback.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
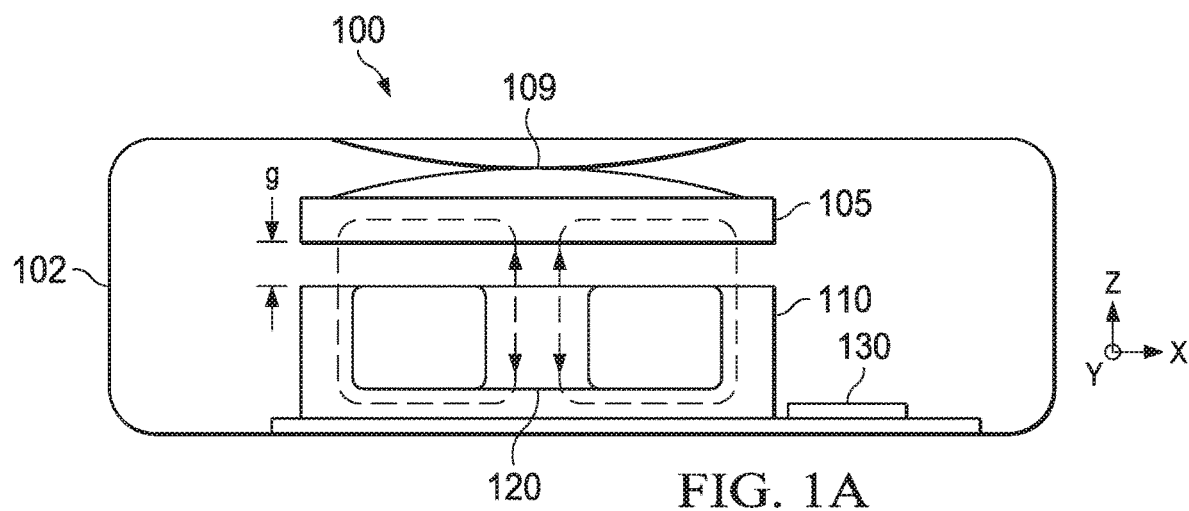
FIG. 1A shows an example of a gap-closing actuator having a double-wound driving coil.

FIG. 1A is a cross-section view, e.g., in the (x,z)-plane, of an example of a gap-closing actuator 100 that includes a double-wound driving coil 120 having two windings configured as described below in FIGS. 1B-1D. The double-wound driving coil 120 is part of a stator 110. The gap-closing actuator 100 also includes a ferromagnetic rotor, referred to interchangeably as attraction plate 105. The attraction plate 105 has a particular mass, and it is spaced apart from the double-wound driving coil 120 by a gap g. The double-wound driving coil 120 and the attraction plate 105 are movable relative to each other. The gap-closing actuator 100 has a frame 102 that encapsulates the attraction plate 105 and the double-wound driving coil 120. In the example shown in FIG. 1A, the stator 110 holding the double-wound driving coil 120 is mechanically coupled with (i.e., affixed to) the frame 102. Here, the attraction plate 105 is movably coupled with the frame 102 through a coupler 109. The coupler 109 can be implemented as a flexure, e.g., a flexure blade, a compensating flexure, etc., and can be configured to constrain along a single direction, e.g., along the z-axis, the motion of the attraction plate 105 relative to the double-wound coil 120. As such, in the example illustrated in FIG. 1A, the attraction plate 105 vibrates up-and-down on page relative the double-wound coil 120. Driving and sensing circuitry for actuating the gap-closing actuator 100 can be integrated in a driver integrated circuit (IC) 130. In the example shown in FIG. 1A, the driver IC 130 is disposed inside the frame 102. However, the driver IC can also be disposed outside the frame 102.

Figure 1B:
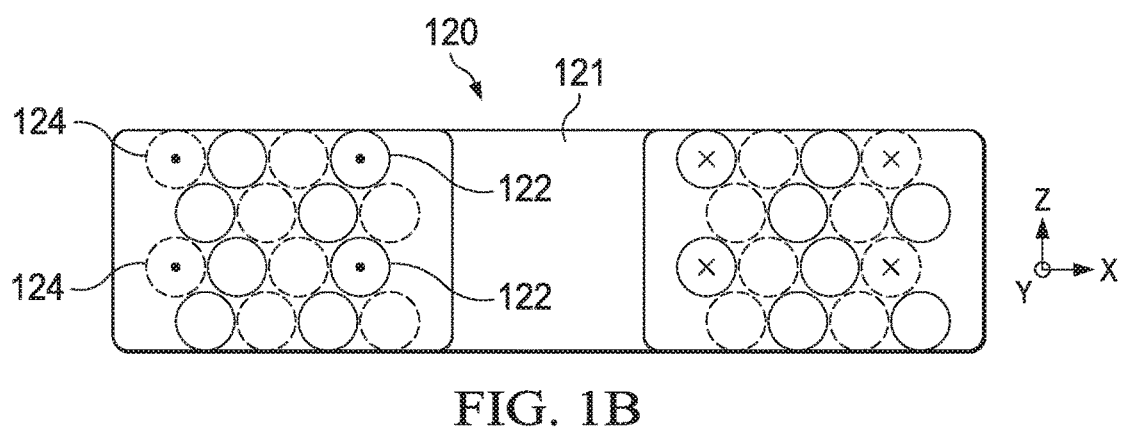
FIG. 1B is a cross-section view of a double-wound driving coil in which the two windings are configured in accordance with a first embodiment.
Figure 1C:
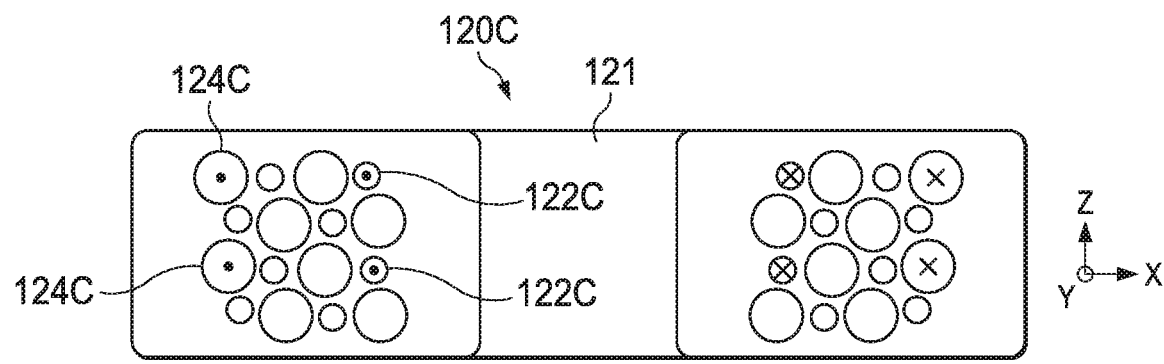
FIG. 1C is a cross-section view of a double-wound driving coil in which the two windings are configured in accordance with a second embodiment.
Figure 1D:
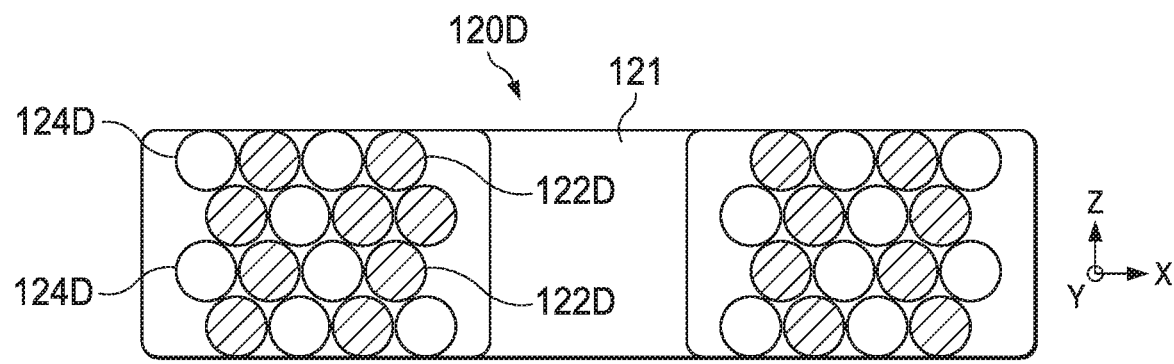
FIG. 1D is a cross-section view of a double-wound driving coil in which the two windings are configured in accordance with a third embodiment.

Each of FIGS. 1B-1D shows a close-up cross-section view of a respective embodiment of a double-wound driving coil 120/120C/120D in the (x,z)-plane. Here, the first coil 122/122C/122D (also referred to as the first winding) and the second coil 124/124C/124D (also referred to as the second winding) are wound together around a common core 121. In this manner, the first coil 122/122C/122D and the second coil 124/124C/124D are thermally, as well as magnetically, matched with each other.

Thus, the thermal matching of the first coil 122/122C/122D and the second coil 124/124C/124D ensures that they will be at substantially the same temperature whether, or not, driving currents are provided there through. In this way, a ratio of a first resistance $R_1$ of the first coil 122/122C/122D to a second resistance $R_2$ of the second coil 124/124C/124D, $$N = \frac{R_1}{R_2},$$

will be consistent during operation of the reluctance motor 100.

The magnetic matching ensures that a magnetic field flux per turn will be the same for both the first coil 122/122C/122D and the second coil 124/124C/124D. For the reluctance motor 100, the magnetic flux is induced by respective driving currents provided to the first coil 122 and the second coil 124 of the double-wound driving coil 120. In this way, a ratio of a first inductance $L_1$ of the first coil 122/122C/122D to a second inductance $L_2$ of the second coil 124/124C/124D, $$M = \frac{L_1}{L_2},$$

will be consistent during the whole operation of the reluctance motor 100, independently from the relative gap g between the attraction plate 105 and the double-wound driving coil 120. Note that, in view of EQ. (3), and because the first coil 122/122C/122D has $n_1$ turns and the second coil 124/124C/124D has $n_2$ turns, the ratio of the inductances is related to the ratio of the turns in the following manner:

$$M = \frac{L_1}{L_2} = \left(\frac{n_1}{n_2}\right)^2. \quad (6)$$

Referring now to the embodiment of a double-wound driving coil 120 like the one illustrated in FIG. 1B, the first coil 122 and the second coil 124 are made from wire of the same material and the same gauge, and have the same coil geometry. If the numbers of turns in the two coils 122, 124 are different, $n_1 \neq n_2$, then the double-wound driving coil 120 has a resistance ratio $$N = \frac{R_1}{R_2} = \frac{n_1}{n_2} \neq 1.$$

Here, in accordance with EQ. (6), the double-wound driving coil 120 has an inductance ratio $M \neq 1$, where $N = \sqrt{M}$. If the numbers of turns in the two coils 122, 124 are the same, $n_1=n_2$, then the double-wound driving coil 120 has a resistance ratio $N=1$ and an inductance ratio $M=1$.

Referring now to the embodiment of a double-wound driving coil 120C like the one illustrated in FIG. 1C, the first coil 122C and the second coil 124C are made from wire of the same material, and have the same coil geometry, and the same number of turns, but different gauge. Since a first cross-section $S_1$ of the first coil 122C is smaller than a second cross-section $S_2$ of the second coil 124C, $S_1<S_2$, the first resistance $R_1$ of the first coil 122C is larger than the second resistance $R_2$ of the second coil 124C, $R_1>R_2$ and the resistance ratio $N>1$, if the first and second coils 122C, 124C have the same number of turns, $n_1=n_2$. In general, if the first and second coils 122C, 124C have different number of turns, $n_1 \neq n_2$, then the resistance ratio $$N = \frac{n_1 S_2}{n_2 S_1}.$$

Here, based on EQ. (6), the resistance ratio N is related to the induction ratio M in the following manner:

$$N = \frac{s_2}{s_1}\sqrt{M}.$$

Therefore, the inequality $N \neq \sqrt{M}$ is satisfied for the double-wound driving coil 120C.

Referring now to the embodiment of a double-wound driving coil 120D like the one illustrated in FIG. 1D, the first coil 122D and the second coil 124D are made from wire of the same gauge, and have the same coil geometry, and the same number of turns, but are made from different materials. Here, the first coil 122D is made from Al, and second coil 124D is made from Cu. Because the resistivities of these materials are different, $\rho_{Al} > \rho_{Cu}$, the resistances of the first coil 122D and the second coil 124D are different, $R_1 > R_2$, and thus the resistance ratio $N>1$, if the first and second coils 122D, 124D have the same number of turns, $n_1=n_2$. In general, if the first and second coils 122D, 124D have different number of turns, $n_1 \neq n_2$, then the resistance ratio $$N = \frac{n_1 \rho_{Al}}{n_2 \rho_{Cu}}.$$

Here, based on EQ. (6), the resistance ratio N is related to the induction ratio M in the following manner:

$$N = \frac{\rho_{Al}}{\rho_{Cu}}\sqrt{M}.$$

Therefore, the inequality $N \neq \sqrt{M}$ is satisfied for the double-wound driving coil 120C. Moreover, Al has higher resistivity than Cu, Al has almost the same temperature coefficient as Cu, so the first and second coils 122D, 124D can be wound close together to track each other's temperature. In general, if the coils 122D, 124D were placed far away from each other (e.g., were not wound together), then the temperature coefficients of the coils 122D, 124D can be chosen to match the power difference to have similar temperature variations. Note that the first coil 122D made from Al causes more power losses than the second coil 124D made from Cu, while having the same inductance as the second coil 124D.

The double-wound driving coil 120/120C/120D of the gap-closing actuator 100 is actuated with one or two driving sources, and the voltages across, and the currents through, the first coil 122/122C/122D and the second coil 124/124C/124D are measured with one or more voltage sensors and one or more current sensors as described below. Additionally, the dynamics of electrical circuits corresponding to the first coil 122/122C/122D and the second coil 124/124C/124D are expressed in accordance with Ohm's law in the following manner:

$$L_1 \frac{dI_1(t)}{dt} = -R_1 I_1(t) + V_{drive_1} - \sqrt{L_1 L_2}\frac{dI_2(t)}{dt}, \quad (7a)$$

$$L_2 \frac{dI_2(t)}{dt} = -R_2 I_2(t) + V_{drive_2} - \sqrt{L_1 L_2}\frac{dI_1(t)}{dt}. \quad (7b)$$

In this manner, the first resistance $R_1$ and the first inductance $L_1$ of the first coil 122/122C/122D, as well as the second resistance $R_2$ and the second inductance $L_2$ of the second coil 124/124C/124D, will be determined, in accordance with EQs. (7a)-(7b), in terms of the measured values of the first driving voltage $V_{drive_1}$ across, and the first driving current $I_1$ through, the first coil 122/122C/122D, and the measured values of the second driving voltage $V_{drive_2}$ across, and the second driving current $I_2$ through, the second coil 124/124C/124D. The determined values of the first and second inductances will be used in conjunction with EQ. (1) and EQ. (3) to determine the gap dynamics, g(t), for the gap-closing actuator 100.

Referring again to FIG. 1A, the attraction plate 105 of the gap-closing actuator 100 is arranged to be driven relative to the frame 102 along the driving direction, e.g., the z-axis, when the first driving current $I_1$ is being supplied through the first coil 122/122C/122D, and the second driving current $I_2$ is being supplied through the second coil 124/124C/124D. When the first and second driving currents are supplied through the respective first and second coils 122/122C/122D, 124/124C/124D of the double-wound driving coil 120/120C/120D, first and second magnetic fluxes $\lambda_1=L_1 I_1$, $\mu_2=L_2 I_2$ are induced in the attraction plate 105, which in turn induce corresponding driving forces that move the attraction plate 105 to cyclically open and close the gap g between the double-wound driving coil 120/120C/120D and the attraction plate 105. The flexure 109, used to couple the attraction plate 105 to the frame 102, is arranged and configured to return the attraction plate 105 to its equilibrium position by opposing the noted periodic driving forces.

The first and second driving currents $I_1$, $I_2$ are provided through the respective first and second coils 122/122C/122D, 124/124C/124D, respectively, in a manner that ensures that the periodic driving forces, caused by the respective first and second driving currents $I_1$, $I_2$, enforce each other. For embodiments of the double-wound driving coil 120/120C/120D in which the first coil 122/122C/122D and the second coil 124/124C/124D are wound together in the same direction, e.g., both in clock-wise directions or both in counter-clock-wise directions, the first driving current $I_1$ and second driving current $I_2$ will be driven in phase, as indicated in FIGS. 1B-1D (also later in FIGS. 2A, 3A, 4A). For embodiments of the double-wound driving coil 120/120C/120D in which the first coil 122/122C/122D and the second coil 124/124C/124D are wound together in opposite directions, e.g., one in clock-wise directions and the other one in counter-clock-wise direction, the first driving current $I_1$ and second driving current $I_2$ will be driven in 180° out-of-phase. In either of the foregoing embodiments, the first driving current $I_1$ and second driving current $I_2$ will are driven with the same frequency. A frequency of the first driving current $I_1$ and second driving current $I_2$ Will is in an operational frequency range of 10 Hz to 5 kHz, e.g., 300 Hz to 1 kHz.

In some implementations, the two windings of the double-wound driving coil of the gap-closing actuator 100 are driven independently using respective driving sources as described next.

Figure 2A:
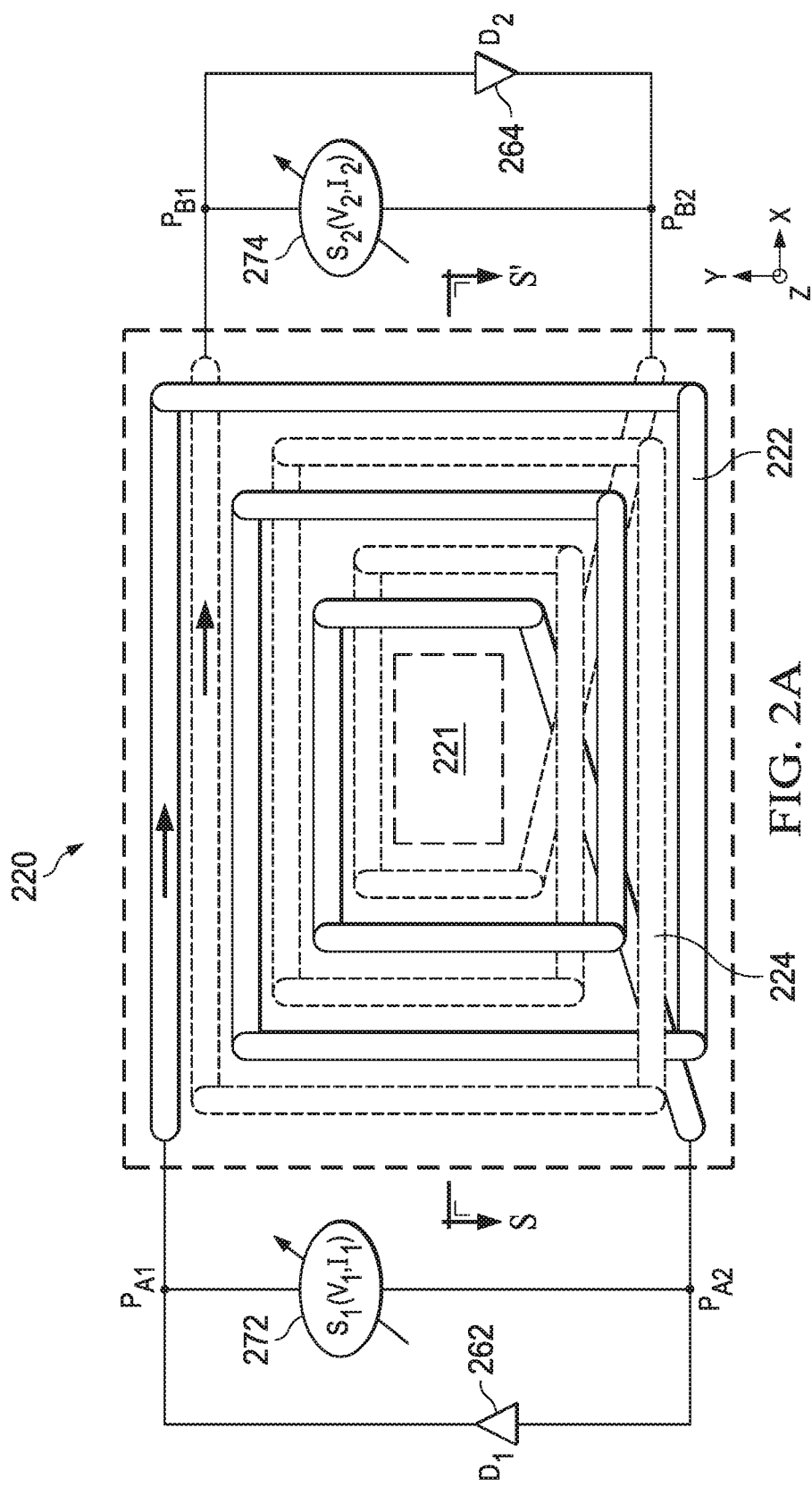
FIGS. 2A-2B show aspects of driving circuitry coupled with a gap-closing actuator having a double-wound driving coil, where the two windings are activated independently by respective drivers.
Figure 2B:
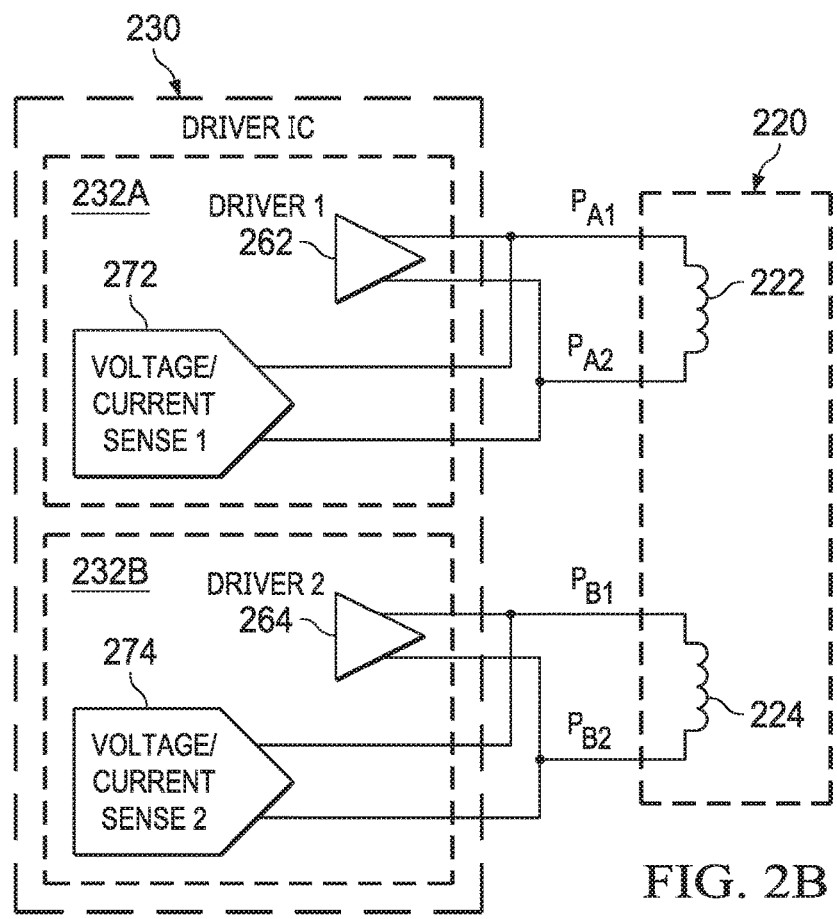

FIG. 2A is a plan-view of a double-wound driving coil 220 which includes a first coil 222 and a second coil 224 wounded together around a common core 221. The first coil 222 has first terminals $P_{A1}$, $P_{A2}$, and the second coil 224 has second terminals $P_{B1}$, $P_{B2}$. Here, the double-wound driving coil 220 is implemented as the embodiment of the double-wound driving coil 120 described above in connection with FIG. 1B. The double-wound driving coil 220 can be implemented as one of the other embodiments of the double-wound driving coil 120C/120D described above. FIG. 2B is schematic electrical diagram of driving and sensing circuitry coupled with a gap-closing actuator's double-wound driving coil 220. In the example shown in FIG. 2B, first and second driving/sensing channels 232A, 232B are integrated together in a driver IC 230. The first driving/sensing channel 232A includes first driver circuitry 262 and first voltage/current sensing circuitry 272, and the second driving/sensing channel 232B includes second driver circuitry 264 and second voltage/current sensing circuitry 274. As shown in FIGS. 2A-2B, each of the first driver circuitry 262 and the first voltage/current sensing circuitry 272 is coupled with the first coil 222 at the first terminals $P_{A1}$, $P_{A2}$, and second driver circuitry 264 and second voltage/current sensing circuitry 274, and each of the second driver circuitry 264 and the second voltage/current sensing circuitry 274 is coupled with the second coil 224 at the second terminals $P_{B1}$, $P_{B2}$.

In another example, not shown in FIG. 2B, the first driving/sensing channel 232A can be implemented as a first driver IC that includes the first driver circuitry 262 and the first voltage/current sensing circuitry 272, each to be coupled with the first coil 222 at the first terminals $P_{A1}$, $P_{A2}$. And, the second driving/sensing channel 232B, can be implemented on a separate, second driver IC that includes the second driver circuitry 264 and the second voltage/current sensing circuitry 274, each to be coupled with the second coil 224 at the second terminals $P_{B1}$, $P_{B2}$. Note that the example of integration shown in FIG. 2B ensures that the first and second driving/sensing channels 232A, 232B occupy a smaller footprint within the haptic actuator, as a single driver IC 230, compared to the noted example integration in which each of the first and second driving/sensing channels 232A, 232B are implemented separately, in its own driver IC.

Referring again to FIGS. 2A-2B, the first driver circuitry 262 includes either a first voltage source for providing a first driving voltage across the first coil 222, or a first current source for providing a first driving current through the first coil 222. The second driver circuitry 264 includes either a second voltage source for providing a second driving voltage across the second coil 224, or a second current source for providing a second driving current through the second coil 224. The first voltage/current sensing circuitry 272 includes a first voltage sensor to measure a first voltage across the first coil 222, and a first current sensor to measure the first current through the first coil 222. The second voltage/current sensing circuitry 274 includes a second voltage sensor to measure a second voltage across the second coil 224, and a second current sensor to measure the second current through the second coil 224.

A case when the independently-driven first and second coils 222, 224 of the have equal resistances, $R_1=R_2=R$, and equal inductances, $L_1=L_2=L$ is described below. In such a case, equations (7a)-(7b) corresponding to the first and second coils 222, 224 of the double-wound driving coil 220 are rewritten as $$L\frac{dI_1}{dt} = -RI_1 + V_{drive_1} - L\frac{dI_2}{dt}, \tag{8a}$$

$$L\frac{dI_2}{dt} = -RI_2 + V_{drive_2} - L\frac{dI_1}{dt}. \tag{8b}$$

In EQs. (8a)-(8b), values of the driving voltages over the respective first and second coils 222, 224, and values of the currents through the respective first and second coils 222, 224 are measured as described above.

An impedance-computing module, e.g., computing circuitry such as a digital signal processor (DSP), can be coupled with the first voltage/current sensing circuitry 272 to receive respective values of the first driving voltage $V_{drive_1}$ across, and the first driving current $I_1$ through, the first coil 222, and with the second voltage/current sensing circuitry 274 to receive respective values of the second driving voltage $V_{drive_2}$ across, and the second driving current $I_2$ through, the second coil 224. Such an impedance-computing module is configured to solve the system of EQs. (8a), (8b) to determine values of both resistance R and inductance L in the following manner:

$$R = \frac{V_{drive_2} - V_{drive_1}}{I_2 - I_1}, \tag{9}$$

$$L = \frac{V_{drive_1}I_2 - V_{drive_2}I_1}{(I_2 - I_1)\left(\frac{dI_1}{dt} + \frac{dI_2}{dt}\right)}. \tag{10}$$

The noted impedance-computing module is configured to determine values of the gap g of the gap-closing actuator 100 by substituting, in EQ. (1) and EQ. (3), the values of the inductance L determined in accordance with EQ. (10). To ensure that the denominator of EQ. (10) is different from zero, the first and second driver circuitries 262, 264 are operated to ensure that (1) the first and second currents $I_1$, $I_2$ induced through the respective first and second coils 222, 224 are different from each other, $I_1 \neq I_2$, and (2) an increase $$\left(+\frac{dI_1}{dt}\right)$$

of the first current is different from a decrease $$\left(-\frac{dI_2}{dt}\right)$$

of the second current, $$\frac{dI_1}{dt} \neq -\frac{dI_2}{dt}.$$

In this manner, the gap g can be determined in real-time without having to measure in real-time resistances of the first and second coils 222, 224, and thus the gap g will be insensitive to temperature variations.

In some implementations, the two windings of the double-wound driving coil of the gap-closing actuator 100 are driven by a single driving source. In some cases, the two windings are connected in series to each other, and in other cases the two windings are connected in parallel to each other. The former cases are as described next.

Figure 3B:
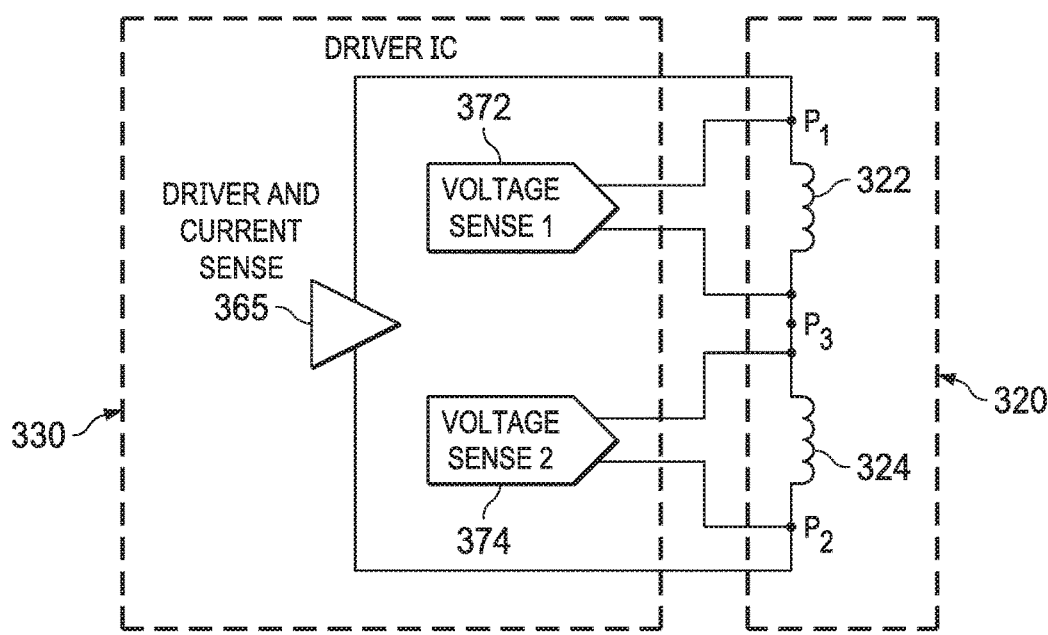
FIGS. 3A-3B show aspects of driving circuitry coupled with a gap-closing actuator having a double-wound driving coil, where the two windings are activated by as single driver and the two windings are connected in series to the driver.
Figure 3A:
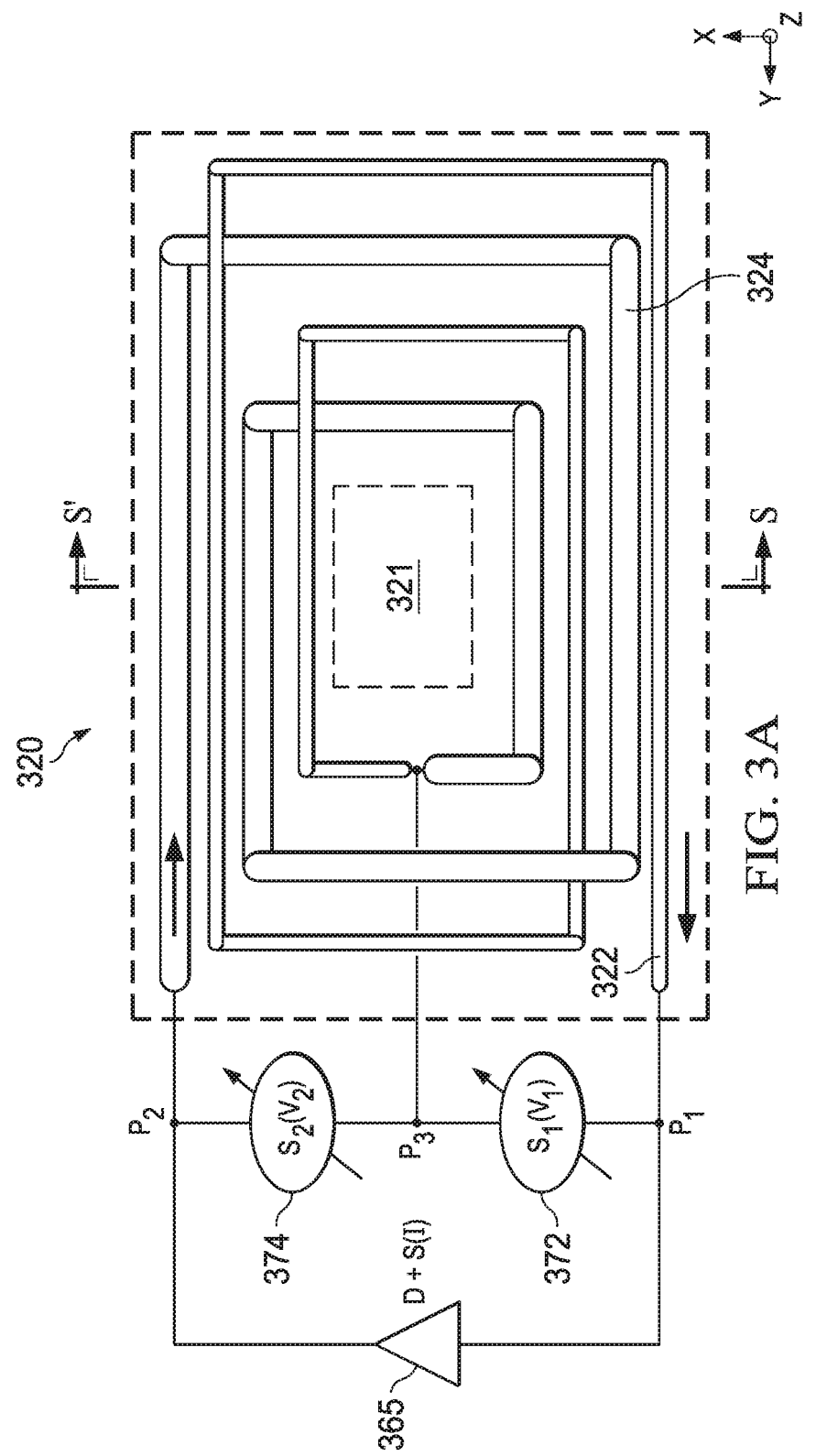

FIG. 3A is a plan-view of a double-wound driving coil 320 which includes a first coil 322 and a second coil 324 wounded together around a common core 321 and electrically coupled to each other in series. The first coil 322 has first terminals $P_1$, $P_3$, and the second coil 324 has second terminals $P_3$, $P_2$, where the common terminal is $P_3$. Here, the double-wound driving coil 320 is implemented as the embodiment of the double-wound driving coil 120C described above in connection with FIG. 1C. The double-wound driving coil 320 can be implemented, in certain cases, as one of the other embodiments of the double-wound driving coil 120/120D described above. FIG. 3B is schematic electrical diagram of driving and sensing circuitry coupled with a gap-closing actuator's double-wound driving coil 320.

As shown in FIGS. 3A-3B, driver circuitry 365 is coupled with the double-wound driving coil 320 at the first terminal $P_1$ and the second terminal $P_2$, first voltage sensing circuitry 372 is coupled with the first coil 322 at the first terminals $P_1$, $P_3$, and second voltage sensing circuitry 374 is coupled with the second coil 324 at the second terminals $P_3$, $P_2$. In FIG. 3B, the driver circuitry 365, the first voltage sensing circuitry 372, and the second voltage sensing circuitry 374 are integrated together in a driver chip 330, referred to as a driver IC. The driver circuitry 365 includes either a voltage source for providing a driving voltage across the series-connected first and second coils 322, 324, or a current source for providing a common driving current through the series-connected first and second coils 322, 324. In addition, the driver circuitry 365 includes a current sensor to measure the current through the series-connected first and second coils 322, 324. The first voltage sensing circuitry 372 includes a first voltage sensor to measure a first driving voltage across the first coil 322, and the second voltage sensing circuitry 374 includes a second voltage sensor to measure a second driving voltage across the second coil 324.

A case, in which the series-connected first and second coils 322, 324 of the double-wound driving coil 320 have (1) resistances that are different by a first factor N≠1, $R_1 = NR_2$, and (2) equal inductances, $L_1 = L_2 = L$, is described first. Moreover, since the first and second coils 322, 324 are connected in series with each other, the currents there through are equal, $I_1 = I_2 = I$. Therefore, equations (7a)-(7b) corresponding to this first case of the series-connected first and second coils 322, 324 of the double-wound driving coil 320 are rewritten as $$L\frac{dI(t)}{dt} = -NR_2 I(t) + V_{drive_1} - L\frac{dI(t)}{dt}, \quad (11a)$$

$$L\frac{dI(t)}{dt} = -R_2 I(t) + V_{drive_2} - L\frac{dI(t)}{dt}. \quad (11b)$$

In EQs. (11a)-(11b), values of the driving voltages over the respective first and second coils 322, 324, and the value of the common current through the first and second coils 322, 324 are measured as described above.

In another example, not shown in FIGS. 3A3-B, either one of the first voltage sensing circuitry 372 or the second voltage sensing circuitry 374 can be arranged and configured to sense driving voltage V across the double-wound driving coil 320. This can be accomplished, in a first case, when the first voltage sensing circuitry 272 is disconnected from the first terminals $P_1$, $P_3$ of the first coil 322, then reconnected to the first terminal $P_1$ and the second terminal $P_2$ of the double-wound driving coil 320, while the second voltage sensing circuitry 374 stays connected as shown in FIGS. 3-3BA. Here, the value $V_{drive_1}$ of the first driving voltage across the first coil 322, to be used in EQ. (11a), will be measured as the difference between the driving voltage V across the double-wound driving coil 320 sensed by the reconnected first voltage sensing circuitry 372, and the second driving voltage $V_{drive_2}$ across the second coil 324 sensed by the second voltage sensing circuitry 374. Alternatively, in a second case, the second voltage sensing circuitry 374 is disconnected from the second terminals $P_2$, $P_3$ of the second coil 324, then reconnected to the first terminal $P_1$ and the second terminal $P_2$ of the double-wound driving coil 320, while the first voltage sensing circuitry 372 stays connected as shown in FIGS. 3A-3B. Here, the value $V_{drive_2}$ of the second driving voltage across the second coil 324, to be used in EQ. (11b), will be measured as the difference between the driving voltage V across the double-wound driving coil 320 sensed by the reconnected second voltage sensing circuitry 374, and the first driving voltage $V_{drive_1}$ across the first coil 322 sensed by the first voltage sensing circuitry 372.

Referring again to FIGS. 3A-3B, the noted impedance-computing module can be coupled with (1) the first voltage sensing circuitry 372 to receive values of the first driving voltage $V_{drive_1}$ across the first coil 322, (2) the second voltage sensing circuitry 374 to receive values of the second driving voltage $V_{drive_2}$ across the second coil 324 of the double-wound driving coil 320, and (3) the current sensor of the driver circuitry 365 to receive the current I through the series-connected first and second coils 322, 324. The impedance-computing module is configured to solve the system of EQs. (11a), (11b) to determine the values of both the second resistance $R_2$ and the inductance L in the following manner:

$$R_2 = \frac{V_{drive_1} - V_{drive_2}}{(N-1)I}, \quad (12)$$

$$L = \frac{NV_{drive_2} - V_{drive_1}}{2(N-1)\frac{dI}{dt}}. \quad (13)$$

The impedance-computing module is configured to determine values of the gap g of the gap-closing actuator 100 by substituting, in EQ. (1) and EQ. (3), the values of the inductance L determined in accordance with EQ. (13). Since as discussed above, N≠1 for the example shown in FIGS. 3A-3B, to ensure that the denominator of EQ. (13) is different from zero, the driver circuitry 365 are operated to ensure that a rate of change $$\frac{dI}{dt}$$

of the current through the series-connected first and second coils 322, 324 is non-zero, $$\frac{dI}{dt} \neq 0.$$

in this manner, the gap g can be determined in real-time without having to measure in real-time resistances of the series-connected first and second coils 322, 324, and thus the gap g will be insensitive to temperature variations.

In another case illustrated in FIGS. 3A-3B, not only the resistances of the series-connected first and second coils 322, 324 are different by the first factor of N≠1, $R_1 = N R_2$, but also the inductances of the series-connected first and second coils 322, 324 are different by a second factor M≠ 1, $L_1 = M L_2$. As in the previously discussed case, the currents through the series-connected first and second coils 322, 324 are equal, $I_1 = I_2 = I$. Therefore, equations (7a)-(7b) corresponding to this second case of the series-connected first and second coils 322, 324 of the double-wound driving coil 320 are rewritten as $$ML_2 \frac{dI(t)}{dt} = -NR_2 I(t) + V_{drive_1} - L_2 \sqrt{M} \frac{dI(t)}{dt}, \quad (14a)$$

$$L_2 \frac{dI(t)}{dt} = -R_2 I(t) + V_{drive_2} - L_2 \sqrt{M} \frac{dI(t)}{dt}. \quad (14b)$$

In EQs. (14a)-(14b), values of the driving voltages over the respective first and second coils, and values of the common current through the first and second coils are measured as described above. And the noted impedance-computing module receives the measured values of the first and second driving voltages, and values of the common current as described above. The impedance-computing module is configured to solve the system of EQs. (14a), (14b) to determine the values of both the second resistance $R_2$ and the second inductance $L_2$ in the following manner:

$$R_2 = \frac{V_{drive_1} - \sqrt{M} V_{drive_2}}{(N - \sqrt{M})I}, \quad (15)$$

$$L_2 = \frac{NV_{drive_2} - V_{drive_1}}{(N - \sqrt{M})(1 + \sqrt{M})\frac{dI}{dt}}. \quad (16)$$

The impedance-computing module is configured to determine values of the gap g of the gap-closing actuator 100 by substituting, in EQ. (1) and EQ. (3), the values of the inductance L determined in accordance with EQ. (16). To ensure that the denominator of EQ. (16) is different from zero, the following two aspects will be implemented. As a first aspect, the driver circuitry 365 will be operated to ensure that a rate of change $$\frac{dI}{dt}$$

of the current through the series-connected first and second coils 322, 324 is non-zero, $$\frac{dI}{dt} \neq 0.$$

As a second aspect, the double-wound driving coil 320 will be implemented as the embodiment of the double-wound driving coil 120C or 120D, which ensures that the first factor N, by which the resistances differ from each other, is different from the square root of the second factor M by which the inductances differ from each other, $N \neq \sqrt{M}$.

Finally, note that if the second factor M=1, then the results (15) and (16) are equivalent to the results (12) and (13), respectively. In this manner once again, the gap g can be determined in real-time without having to measure in real-time resistances of the series-connected first and second coils 322, 324, and thus the gap g will be insensitive to temperature variations.

In other implementations, the two windings of the double-wound driving coil of the gap-closing actuator 100 are connected in parallel to each other, and are driven by a single driving source, as described next.

Figure 4A:
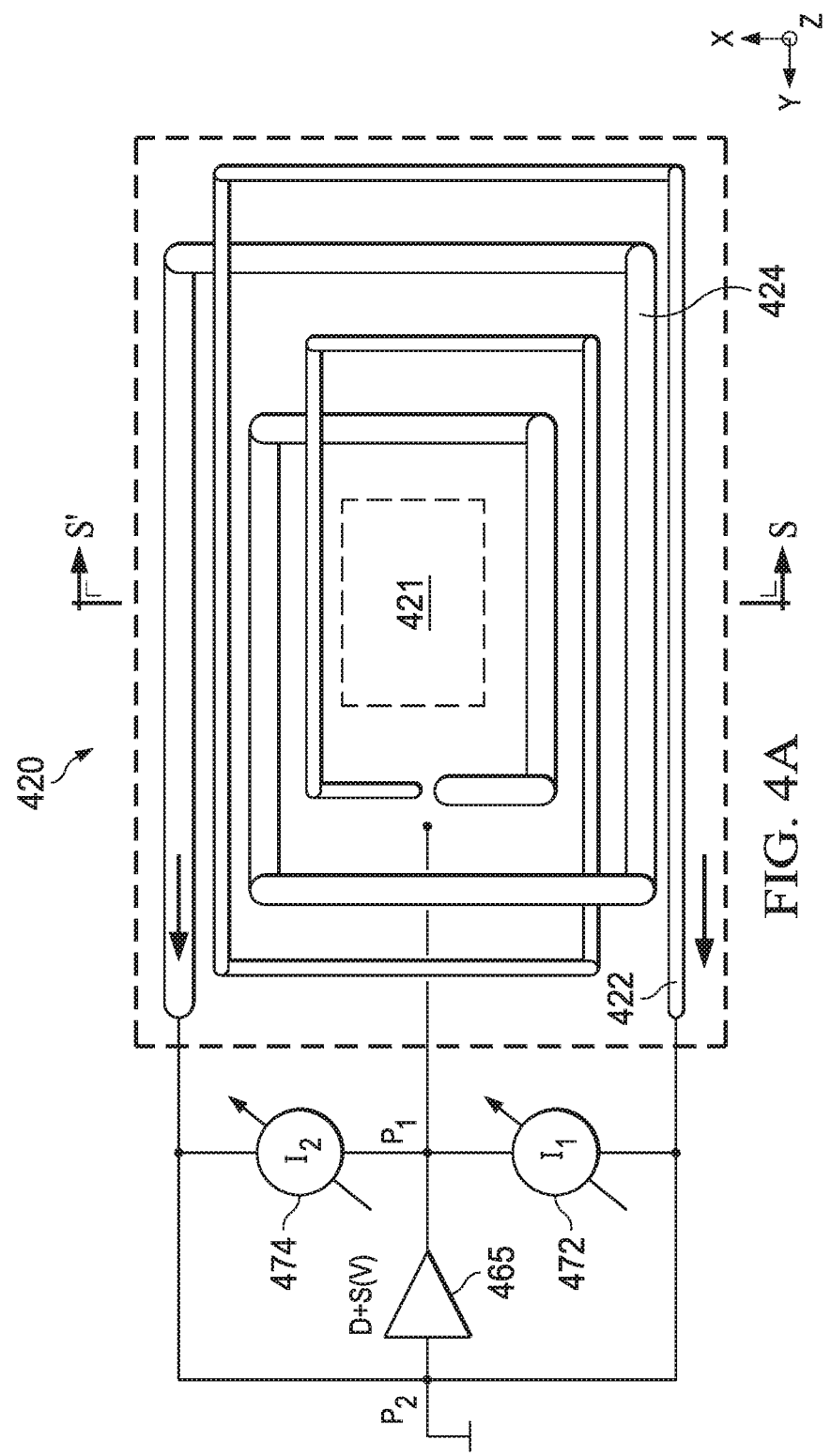
FIGS. 4A-4B show aspects of driving circuitry coupled with a gap-closing actuator having a double-wound driving coil, where the two windings are activated by as single driver and the two windings are connected in parallel to the driver.
Figure 4B:
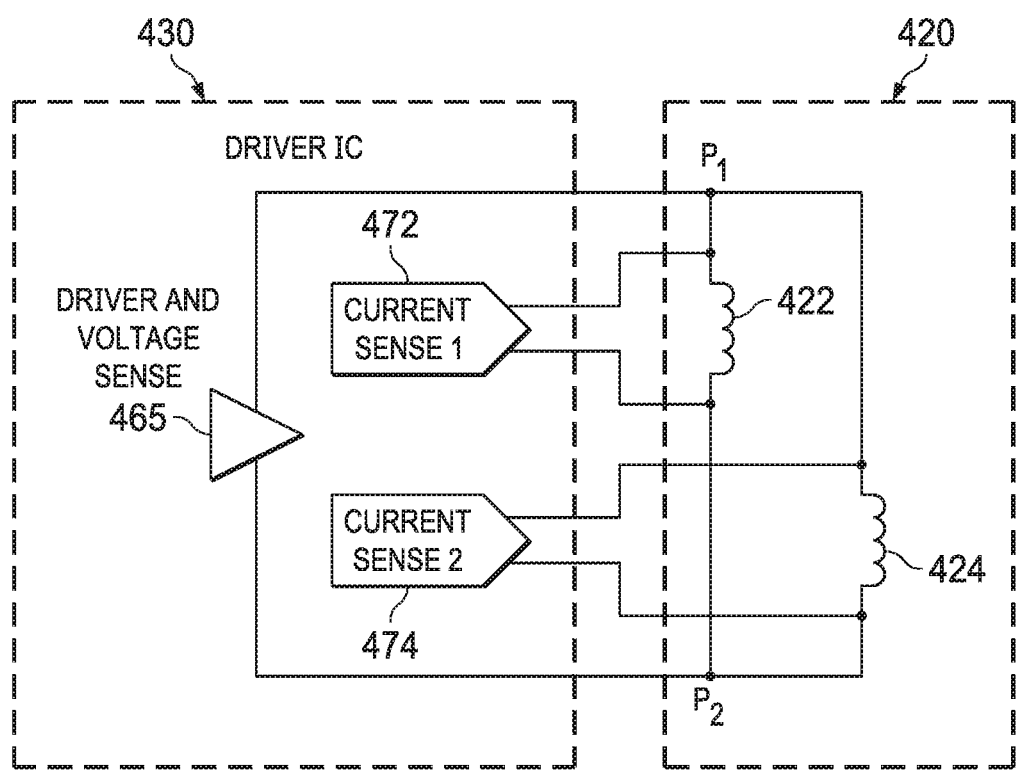

FIG. 4A is a plan-view of a double-wound driving coil 420 which includes a first coil 422 and a second coil 424 wounded together around a common core 421 and electrically coupled to each other in parallel. The first coil 422 has first terminals $P_1$, $P_2$, and the second coil 424 has second terminals $P_1$, $P_2$, where $P_1$ is a common terminal, and so is $P_2$. Here, the double-wound driving coil 420 is implemented as the embodiment of the double-wound driving coil 120C described above in connection with FIG. 1C. The double-wound driving coil 320 can be implemented, in certain cases, as one of the other embodiments of the double-wound driving coil 120/120D described above. FIG. 4B is schematic electrical diagram of driving and sensing circuitry coupled with a gap-closing actuator's double-wound driving coil 420.

As shown in FIGS. 4A-4B, driver circuitry 465 is coupled with the double-wound driving coil 420 at the first terminal $P_1$ and the second terminal $P_2$, first current sensing circuitry 472 is coupled with the first coil 422, and second current sensing circuitry 474 is coupled with the second coil 424. In FIG. 4B, the driver circuitry 465, the current voltage sensing circuitry 472, and the second current sensing circuitry 474 are integrated together in a driver chip 430, referred to as a driver IC. The driver circuitry 465 includes a voltage source for providing a driving voltage across the parallel-connected first and second coils 422, 424. In addition, the driver circuitry 465 includes a voltage sensor to measure the voltage across the parallel-connected first and second coils 422, 424. The first current sensing circuitry 472 includes a first current sensor to measure a first driving current through the first coil 422, and the second current sensing circuitry 474 includes a second current sensor to measure a second driving current through the second coil 424.

Moreover, as shown in FIGS. 4A-4B, the first coil 422 and the second coil 424 of the implementation of the double-wound driving coil 420 are wound together in opposite directions, e.g., one in clock-wise directions and the other one in counter-clock-wise direction. In this manner, the driving currents $I_1$ and $I_2$ are provided 180° out-of-phase through the first coil 422 and the second coil 424, respectively, to ensure that the driving forces, caused by the respective fluxes $L_1 I_1$ and $L_2 I_2$, enforce each other.

A case, in which the parallel-connected first and second coils 422, 424 of the double-wound driving coil 420 have (1) resistances that are different by a first factor N≠1, $R_1 = N R_2$, and (2) inductances that are different by a second factor $M \neq 1$, $L_1 = ML_2$, is described next. Moreover, since the first and second coils 422, 424 are connected in parallel with each other, the voltages across them are equal, $V_{drive_1} = V_{drive_2} = V_{drive}$. Therefore, equations (7a)-(7b) corresponding to this case of the parallel-connected first and second coils 422, 424 of the double-wound driving coil 420 are rewritten as $$ML_2 \frac{dI_1(t)}{dt} = -NR_2 I_1(t) + V_{drive} - L_2\sqrt{M}\frac{dI_2(t)}{dt}, \quad (17a)$$

$$L_2 \frac{dI_2(t)}{dt} = -R_2 I_2(t) + V_{drive} - L_2\sqrt{M}\frac{dI_1(t)}{dt}. \quad (17b)$$

In EQs. (17a)-(17b), values of the driving currents through the respective first and second coils 422, 424 and the value of the common voltage across the first and second coils 422, 424 are measured as described above.

The noted impedance-computing module can be coupled with (1) the first current sensing circuitry 472 to receive values of the first driving current $I_1$ through the first coil 422, (2) the second current sensing circuitry 474 to receive values of the second driving current $I_2$ through the second coil 424 of the double-wound driving coil 420, and (3) the voltage sensor of the driver circuitry 465 to receive the voltage $V_{drive}$ across the parallel-connected first and second coils 422, 424. The impedance-computing module is configured to solve the system of EQs. (17a), (17b) to determine the values of both the second resistance $R_2$ and the second inductance $L_2$ in the following manner:

$$R_2 = \frac{V_{drive}(\sqrt{M} - 1)}{I_2(\sqrt{M} - N\frac{I_1}{I_2})}, \quad (18)$$

$$L_2 = \frac{V_{drive}(1 - N\frac{I_1}{I_2})}{\left(\frac{dI_2}{dt} + \sqrt{M}\frac{dI_1}{dt}\right)(\sqrt{M} - N\frac{I_1}{I_2})}. \quad (19)$$

The impedance-computing module is configured to determine values of the gap g of the gap-closing actuator 100 by substituting, in EQ. (1) and EQ. (3), the values of the second inductance $L_2$ determined in accordance with EQ. (19). To ensure that the denominator of EQ. (19) is different from zero, the driver circuitry 465 are operated, and the double-wound driving coil 420 is configured, to ensure that $$\frac{dI_2}{dt} + \sqrt{M}\frac{dI_1}{dt} \neq 0,$$

and that $$\sqrt{M} - N\frac{I_1}{I_2} \neq 0.$$

In this manner, the gap g can be determined in real-time without having to measure in real-time resistances of the parallel-connected first and second coils 422, 424, and thus the gap g will be insensitive to temperature variations.

Note that the disclosed techniques for determining the impedance of the windings 122/122C/122D, 124/124C/124D of the double-wound driving coil 120/120C/120D, and the gap between it and the attraction plate 105, of the gap-closing actuator 100 can be implemented in a similar manner in a gap-closing actuator that includes a multi-stage driving system. A gap-closing actuator of this type includes an array of two or more driving coils. At least one of the driving coils of the array has two windings arranged and configured as the double-wound driving coil 120/120C/120D (implemented as either 220, 320 or 420), while each of the remaining one or more driving coils of the array has one winding arranged and configured as a single-wound driving coil. The noted array of two or more driving coils is disposed on, and mechanically coupled with (i.e., affixed to), the frame of this type of gap-closing actuator. For instance, the array of two or more driving coils can be disposed on a surface of the gap-closing actuator frame parallel to the (x,y)-plane, such that their magnetic axes are normal to the (x,y)-plane. Here, the driving forces caused by fluxes induced in the attraction plate by the at least one double-wound driving coil 120/120C/120D and the respective one or more single-wound driving coils enforce each other to cause a stronger, and/or more controllable, vibration of the gap-closing actuator's attraction plate. The at least one doub0le-wound driving coil 120/120C/120D of the array is accompanied by corresponding circuitry 262/272/264/274, 365/372/374 and 465/472/474, and each of the one or more single-wound driving coils is accompanied by corresponding driving/sensing circuitry. Based on the equations discussed above—here corresponding to the at least one double-wound driving coil 120/120C/120D of the array—values of the gap between the double-wound driving coil 120/120C/120D and the attraction plate of the gap-closing actuator's attraction plate will be determined.

Figure 5:
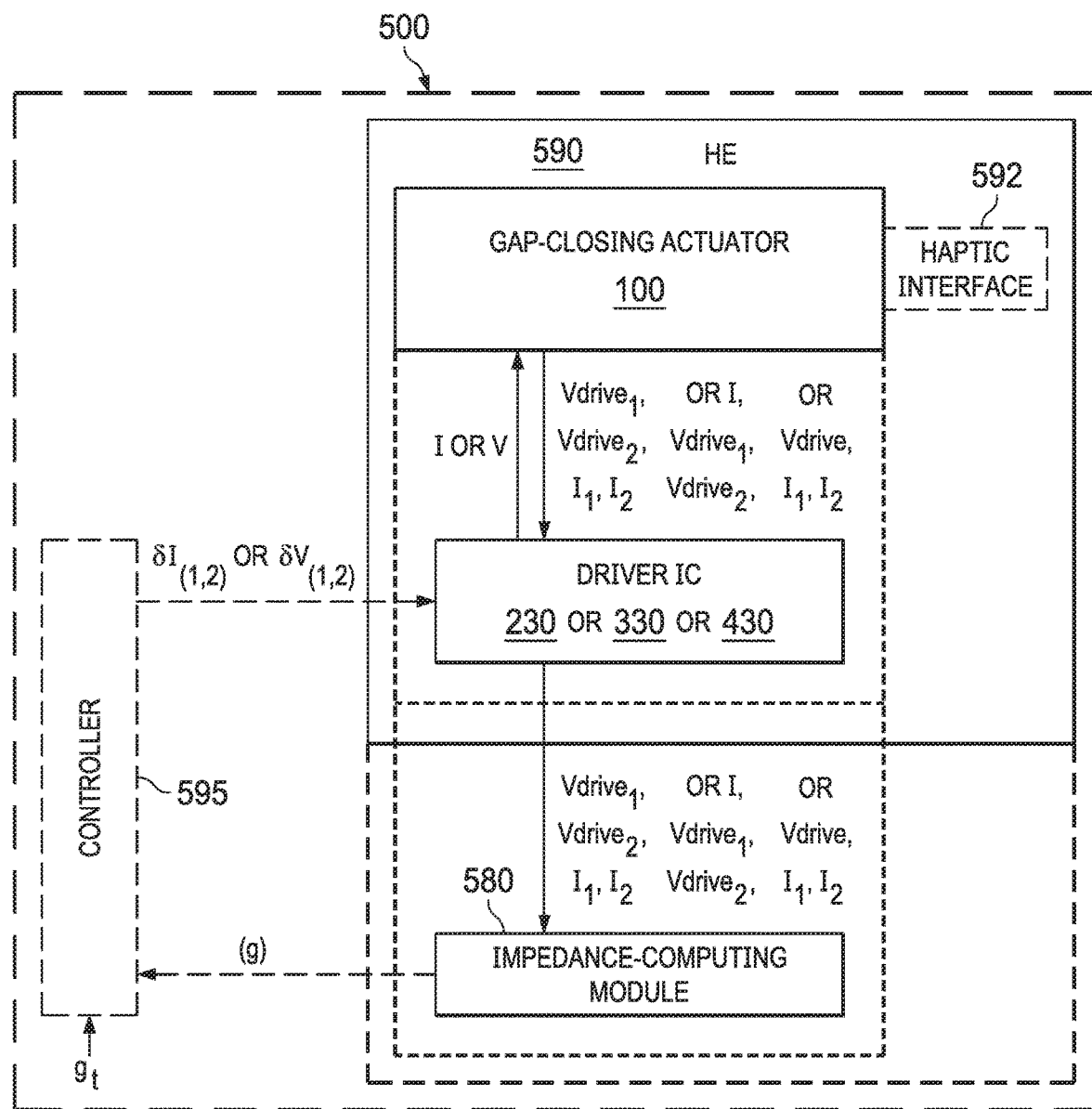
FIG. 5 is an example of computing device architecture that uses a haptic engine including the disclosed gap-closing actuator.

FIG. 5 shows a haptic engine 590, which includes the gap-closing actuator 100, either the driver IC 230, the driver IC 330 or the driver IC 430, and the above-noted impedance-computing module, here having the reference numeral 580. Note that, depending on the implementation, both, one, or none of the driver IC 230/330/430 and the impedance-computing module 580 are disposed inside the frame 102 of the gap-closing actuator 100. Correspondingly, none, one, or both of the driver IC 230/330/430 and the impedance-computing module 580 can be disposed inside the frame 102 of the gap-closing actuator 100.

In some of the implementations described above, the driver IC 230 is configured to provide a first driving voltage across, or a first driving current through, the first coil 222 of the double-wound driving coil 220, a second driving voltage across, or a second driving current through, the second coil 224 of the double-wound driving coil 220. Further, the driver IC 230 is configured to sense, using the first voltage/current sensing circuitry 272, and then transmit to the impedance-computing module 580, the values of the first voltage across, and the first current through, the first coil 222. Furthermore, the driver IC 230 is configured to sense, using the second voltage/current sensing circuitry 274, and then transmit to the impedance-computing module 580, the values of the second voltage across, and the second current through, the first coil 222. The impedance-computing module 580 is configured to determine the resistance and inductance of each of the first and second coils 222, 224 of the double-wound driving coil 220, in accordance with EQs. (9)-(10).

In other of the implementations described above, the driver IC 330 is configured to provide a driving voltage across, or a driving current through, the series-connected first and second coils 322, 324 of the double-wound driving coil 320. Further, the driver IC 330 is configured to sense, using current sensor of driver 365, and then transmit to the impedance-computing module 580, the values of the current through the series-connected first and second coils 322, 324. Furthermore, the driver IC 330 is configured to sense, using the first voltage sensing circuitry 372, and then transmit to the impedance-computing module 580, the values of the first voltage across the first coil 322. Also, the driver IC 330 is configured to sense, using the second voltage sensing circuitry 374, and then transmit to the impedance-computing module 580, the values of the second voltage across the second coil 324. The impedance-computing module 580 is configured to determine the resistance and inductance of each of the series-connected first and second coils 322, 324 of the double-wound driving coil 320, in accordance with EQs. (12)-(13), when the resistances ratio N≠1 and the inductance ratio M=1. The impedance-computing module 580 is configured to determine the resistance and inductance of each of the series-connected first and second coils 322, 324 of the double-wound driving coil 320, in accordance with EQs. (15)-(16), when both the resistances ratio N≠1 and the inductance ratio M¿1.

In yet other of the implementations described above, the driver IC 430 is configured to provide a driving voltage across the parallel-connected first and second coils 422, 424 of the double-wound driving coil 420. Further, the driver IC 430 is configured to sense, using the voltage sensor of driver 465, and then transmit to the impedance-computing module 580, the values of the voltage across the parallel-connected first and second coils 422, 424. Furthermore, the driver IC 430 is configured to sense, using the first current sensing circuitry 472, and then transmit to the impedance-computing module 580, the values of the first current through the first coil 422. Also, the driver IC 430 is configured to sense, using the second current sensing circuitry 474, and then transmit to the impedance-computing module 580, the values of the second current through the second coil 424. The impedance-computing module 580 is configured to determine the resistance and inductance of each of the parallel-connected first and second coils 422, 424 of the double-wound driving coil 420, in accordance with EQs. (18)-(19).

In each of the above-noted implementations of the gap-closing actuator 100, the impedance-computing module 580 is configured to determine the gap between the double-wound driving coil 220/320/420 and the attraction plate 105 of the gap-closing actuator 100, in accordance with EQ. (1) and EQ. (3).

FIG. 5 shows that the haptic engine 590 can be integrated in a device 500, for instance a smartphone, a tablet, a laptop or a watch. In the example illustrated in FIG. 5, the device 500 includes a haptic interface 592, and the haptic engine 590 is part of, or coupled with, the haptic interface 592. In this manner, vibration of the attraction plate 105 of the gap-closing actuator 100 causes the haptic interface 592 to produce a specified vibration.

The device 500 includes a controller 595, e.g., a CPU, an ASIC, etc., configured to receive, e.g., from an app executed or accessed by the device 500, a target gap signal, denoted in FIG. 5 as $g_t$, corresponding to a vibration to be produced by the haptic interface 592. Here, the controller 595 is coupled with both the driver IC 230/330/430 and the impedance-computing module 580 of the haptic engine 590. The impedance-computing module 580 is configured to transmit to the controller 595 the gap signal g determined by the impedance-computing module 580 and corresponding to the instant gap between the double-wound driving coil 220/320/420 and the attraction plate 105 of the gap-closing actuator 100. In this example, the controller 595 is configured to compare the determined gap signal g to the target gap signal $g_t$. The controller 595 is configured to instruct the driver IC 230/330/430, based on the comparison, to implement current adjustments $\delta I$, $\delta I_1$, $\delta I_2$ of the driving current or voltage adjustments $\delta V$, $\delta V_1$, $\delta V_2$ of the driving voltage suitably supplied by the driver circuitry 262/264, 365, 465 across or through the windings of the corresponding double-wound driving coil 220, 320, 420, depending on the implementation of the gap-closing actuator 100.

In summary, the disclosed haptic engines (e.g., 590) include a gap-closing actuator (e.g., 100) having a coil (e.g., 220 implemented as 120) with two windings (e.g., 222, 224) wound together around a common core (e.g., 221), and methods for determining inductances of the two windings of the disclosed coil (220). The disclosed methods include supplying a first driving current (e.g., $I_1$) through a first (222) of the two windings; supplying a second driving current (e.g., $I_2$) through a second (224) of the two windings, such that the second driving current ($I_2$) is different than the first driving current ($I_1$), and an increase ($+dI_1/dt$) of the first current is different from a decrease ($-dI_2/dt$) of the second current, $(+dI_1/dt)\neq(-dI_2/dt)$; sensing a first voltage (e.g., $Vdrive_1$) across the first winding (222); sensing a second voltage (e.g., $Vdrive_2$) across the second winding (224); and computing a first inductance (e.g., $L_1$) of the first winding (222), and a second inductance (e.g., $L_2$) of the second winding (224), wherein each of the first inductance ($L_1$) and the second impedance ($L_2$) is computed independently of resistances ($R_1$, $R_2$) of either the first winding (222) or the second winding (224), and dependently of the first driving current ($I_1$) through, and the first voltage ($Vdrive_1$) over, the first winding (222), and the second driving current ($I_2$) through, and the second voltage ($Vdrive_2$) over, the second winding (224).

It was shown that, when the first winding (222) and the second winding (224) are identical, computing the inductance (e.g., L) of each of the two windings (222, 224) is performed in accordance with the following expression:

$$L = \frac{V_{drive_1} I_2 - V_{drive_2} I_1}{(I_2 - I_1)\left(\frac{dI_1}{dt} + \frac{dI_2}{dt}\right)}.$$

In yet another embodiment, the disclosed haptic engines (e.g., 590) include, in one embodiment, a gap-closing actuator (e.g., 100) having a coil (e.g., 320 implemented as 120C or 120D) with two windings (e.g., 322, 324) connected in series to each other and wound together around a common core (321). A first ratio $$N = \frac{R_1}{R_2}$$

of the resistances of a first (322) of the two windings and second (324) of the two windings is different from the square root of a second ratio $$M = \frac{L_1}{L_2}$$

of the inductances of the first winding (322) and the second winding (324), N≠√M. Methods for determining inductances of the two windings (322,324) of the disclosed coil (320) were described. The disclosed methods include supplying a driving current (I) through the two series-connected windings (322, 324), such that its rate of change is non-zero, (dI/dt)≠0; sensing a first voltage (Vdrive$_1$) across the first winding (322); sensing a second voltage (Vdrive$_2$) across the second winding (324); and computing a first inductance (e.g., L$_1$) of the first winding (322) and a second inductance (e.g., L$_2$) of the second winding (324). Each of the first and second inductances (L$_1$,L$_2$) is computed independently of resistances (R$_1$,R$_2$) of either the first winding (322) or the second winding (324), and dependently of the first driving voltage (Vdrive$_1$) over the first winding (322) and the second driving voltage (Vdrive$_2$) over the second winding (324), the rate of change of the driving current (dI/dt) through the two windings (322,324), and the first and second ratios (N, M).

It was shown that computing the first inductance (L$_1$) and the second inductance (L$_2$) is performed in accordance with the following expressions:

$$L_2 = \frac{NV_{drive_2} - V_{drive_1}}{(N - \sqrt{M})(1 + \sqrt{M})\frac{dI}{dt}}, \text{ and}$$

$$L_1 = ML_2.$$

In some implementations of the latter embodiment, the first and second windings (322, 324) have different resistances, N≠1, but the same inductance, L$_1$=L$_2$=L. It was shown that computing the common inductance (L) is performed in accordance with the following expression:

$$L = \frac{NV_{drive_2} - V_{drive_1}}{2(N-1)\frac{dI}{dt}}.$$

In yet another embodiment, the disclosed haptic engines (e.g., 590) include a gap-closing actuator (e.g., 100) having a coil (e.g., 420 implemented as 120C or 120D) with two windings (e.g., 422, 424) connected in parallel to each other and wound together around a common core (e.g., 421). Methods for determining inductances of the two windings (422,424) of the disclosed coil (420) were described. The disclosed methods include supplying a driving voltage (e.g., Vdrive) across the two parallel-connected windings (422, 424) to induce respective currents (e.g., I$_1$, I$_2$), where a first ratio $$\frac{I_1}{I_2}$$

of the first and second currents is different from a ratio of square root of a second ratio $$M = \frac{L_1}{L_2}$$

or the inductances of the first winding (422) and the second winding (424) and a third ratio $$N = \frac{R_1}{R_2}$$

of the resistances of the first winding (422) and the second winding (424), $$\frac{I_1}{I_2} \neq \frac{\sqrt{M}}{N},$$

and where an increase (+dI$_1$/dt) of the first current scaled by the square root √M of the first ratio is different from a decrease (−dI$_2$/dt) of the second current, √M(+dI$_1$/dt)≠(−dI$_2$/dt); sensing the first current (I$_1$) through the first winding (422); sensing the second current (I$_2$) through the second winding (424); and computing a first inductance (e.g., L$_1$) of the first winding (422) and a second inductance (e.g., L$_2$) of the second winding (424). Each of the first and second inductances (L$_1$,L$_2$) is computed independently of resistances (e.g., R$_1$,R$_2$) of either the first winding (322) or the second winding (324), and dependently of the driving voltage (Vdrive) across the two parallel-connected windings (422, 424), the rates of change (dI$_1$/dt, dI$_2$/dt) of the first and second currents, and the first, second, and third ratios (I$_1$/I$_2$, N, M).

It was shown that computing the first inductance (L$_1$) and the second inductance (L$_2$) is performed in accordance with the following expressions:

$$L_2 = \frac{V_{drive}\left(1 - N\frac{I_1}{I_2}\right)}{\left(\frac{dI_2}{dt} + \sqrt{M}\frac{dI_1}{dt}\right)\left(\sqrt{M} - N\frac{I_1}{I_2}\right)}, \text{ and}$$

$$L_1 = ML_2.$$

Figure 6:
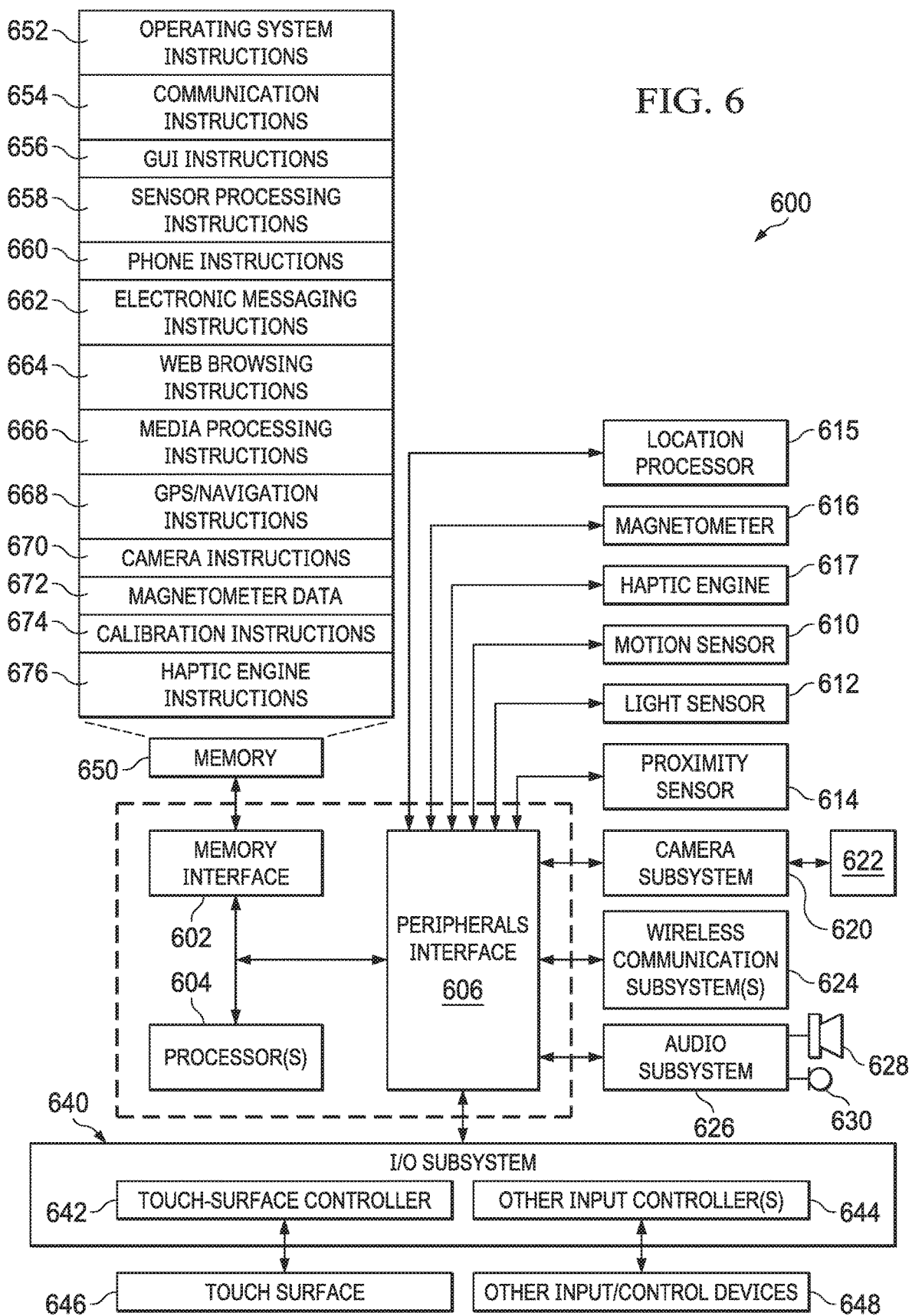
FIG. 6 is an example mobile device architecture that uses a haptic engine including the disclosed gap-closing actuator, according to an embodiment.
Figure 7:
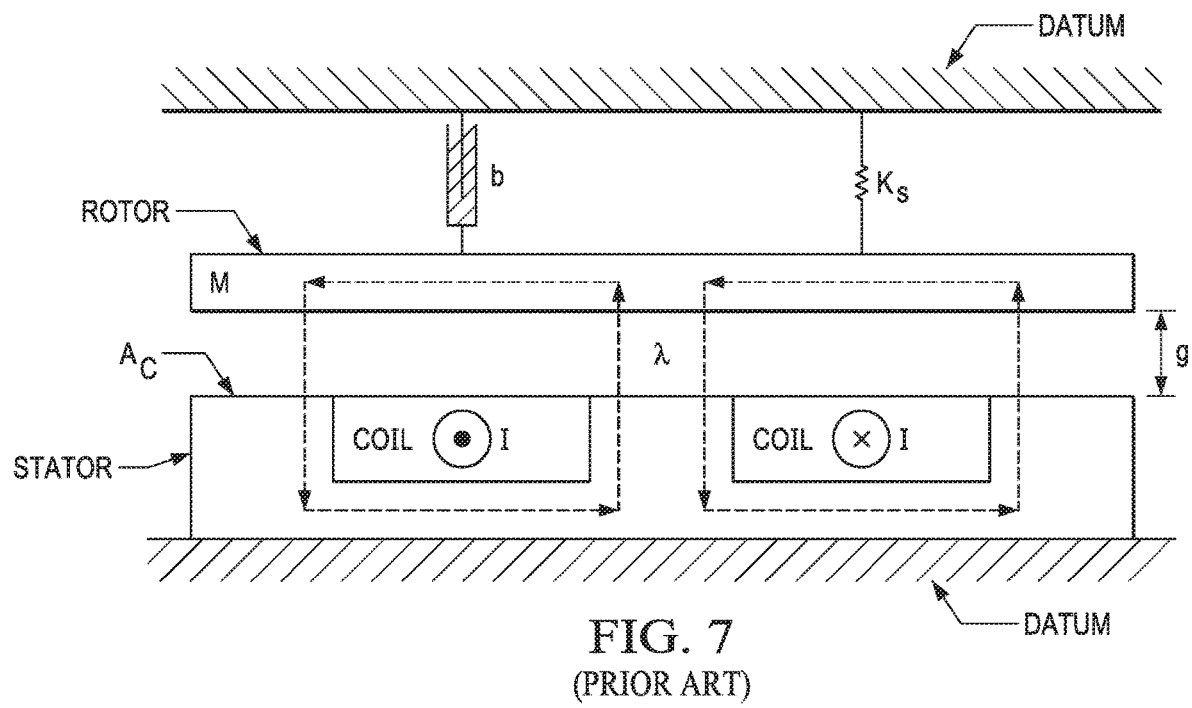
FIG. 7 shows a combination of an electromagnetic system and mechanical system coupled with each other corresponding to a gap-closing actuator having a conventional driving coil.
Figure 8:
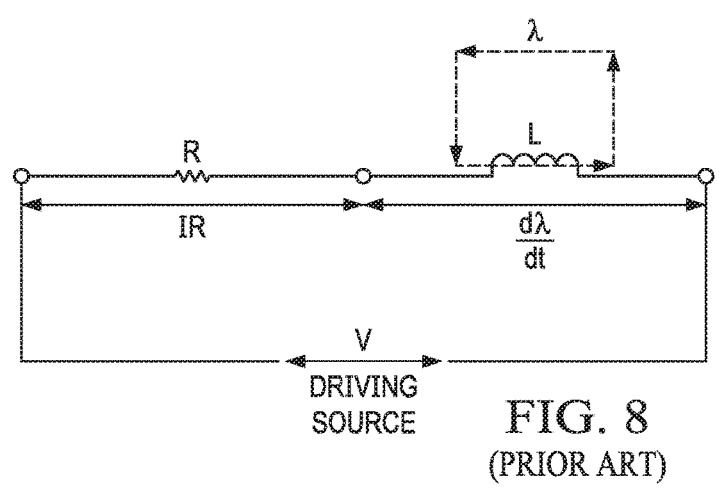
FIG. 8 shows an equivalent electrical circuit of a gap-closing actuator having a conventional driving coil.

FIG. 6 is a diagram of an example of mobile device architecture that uses the haptic engine 590 described in reference to FIGS. 1-5, according to an embodiment. Architecture 600 may be implemented in any mobile device for generating the features and processes described in reference to FIGS. 1-5, including but not limited to smart phones and wearable computers (e.g., smart watches, fitness bands). Architecture 600 may include memory interface 602, data processor(s), image processor(s) or central processing unit(s) 604, and peripherals interface 606. Memory interface 602, processor(s) 604 or peripherals interface 606 may be separate components or may be integrated in one or more integrated circuits. One or more communication buses or signal lines may couple the various components.

Sensors, devices, and subsystems may be coupled to peripherals interface 606 to facilitate multiple functionalities. For example, motion sensor(s) 610, light sensor 612, and proximity sensor 614 may be coupled to peripherals interface 606 to facilitate orientation, lighting, and proximity functions of the device. For example, in some embodiments, light sensor 612 may be utilized to facilitate adjusting the brightness of touch surface 646. In some embodiments, motion sensor(s) 610 (e.g., an accelerometer, rate gyroscope) may be utilized to detect movement and orientation of the device. Accordingly, display objects or media may be presented according to a detected orientation (e.g., portrait or landscape).

Haptic engine 617, under the control of haptic engine instructions 672, provides the features and performs the processes described in reference to FIGS. 1-5, such as, for example, implementing haptic feedback (e.g., vibration). Haptic engine 617 can include one or more actuators, such as piezoelectric transducers, electromechanical devices, and/or other vibration inducing devices, which are mechanically connected to an input surface (e.g., touch surface 46). Drive electronics (e.g., 230) coupled to the one or more actuators cause the actuators to induce a vibratory response into the input surface, providing a tactile sensation to a user touching or holding the device.

Other sensors may also be connected to peripherals interface 606, such as a temperature sensor, a barometer, a biometric sensor, or other sensing device, to facilitate related functionalities. For example, a biometric sensor can detect fingerprints and monitor heart rate and other fitness parameters. In some implementations, a Hall sensing element in haptic engine 617 can be used as a temperature sensor.

Location processor 615 (e.g., GNSS receiver chip) may be connected to peripherals interface 606 to provide geo-referencing. Electronic magnetometer 616 (e.g., an integrated circuit chip) may also be connected to peripherals interface 606 to provide data that may be used to determine the direction of magnetic North. Thus, electronic magnetometer 616 may be used to support an electronic compass application.

Camera subsystem 620 and an optical sensor 622, e.g., a charged coupled device (CCD) or a complementary metal-oxide semiconductor (CMOS) optical sensor, may be utilized to facilitate camera functions, such as recording photographs and video clips.

Communications functions may be facilitated through one or more communication subsystems 624. Communication subsystem(s) 624 may include one or more wireless communication subsystems. Wireless communication subsystems 624 may include radio frequency receivers and transmitters and/or optical (e.g., infrared) receivers and transmitters. Wired communication systems may include a port device, e.g., a Universal Serial Bus (USB) port or some other wired port connection that may be used to establish a wired connection to other computing devices, such as other communication devices, network access devices, a personal computer, a printer, a display screen, or other processing devices capable of receiving or transmitting data.

The specific design and embodiment of the communication subsystem 624 may depend on the communication network(s) or medium(s) over which the device is intended to operate. For example, a device may include wireless communication subsystems designed to operate over a global system for mobile communications (GSM) network, a GPRS network, an enhanced data GSM environment (EDGE) network, IEEE802.xx communication networks (e.g., Wi-Fi, Wi-Max, ZigBee™), 3G, 4G, 4G LTE, code division multiple access (CDMA) networks, near field communication (NFC), Wi-Fi Direct and a Bluetooth™ network. Wireless communication subsystems 624 may include hosting protocols such that the device may be configured as a base station for other wireless devices. As another example, the communication subsystems may allow the device to synchronize with a host device using one or more protocols or communication technologies, such as, for example, TCP/IP protocol, HTTP protocol, UDP protocol, ICMP protocol, POP protocol, FTP protocol, IMAP protocol, DCOM protocol, DDE protocol, SOAP protocol, HTTP Live Streaming, MPEG Dash and any other known communication protocol or technology.

Audio subsystem 626 may be coupled to a speaker 628 and one or more microphones 630 to facilitate voice-enabled functions, such as voice recognition, voice replication, digital recording, and telephony functions. In an embodiment, audio subsystem includes a digital signal processor (DSP) that performs audio processing, such as implementing codecs.

I/O subsystem 640 may include touch controller 642 and/or other input controller(s) 644. Touch controller 642 may be coupled to a touch surface 646. Touch surface 646 and touch controller 642 may, for example, detect contact and movement or break thereof using any of a number of touch sensitivity technologies, including but not limited to, capacitive, resistive, infrared, and surface acoustic wave technologies, as well as other proximity sensor arrays or other elements for determining one or more points of contact with touch surface 646. In one embodiment, touch surface 646 may display virtual or soft buttons and a virtual keyboard, which may be used as an input/output device by the user.

Other input controller(s) 644 may be coupled to other input/control devices 648, such as one or more buttons, rocker switches, thumb-wheel, infrared port, USB port, and/or a pointer device such as a stylus. The one or more buttons (not shown) may include an up/down button for volume control of speaker 628 and/or microphone 630.

In some embodiments, device 600 may present recorded audio and/or video files, such as MP3, AAC, and MPEG video files. In some embodiments, device 600 may include the functionality of an MP3 player and may include a pin connector for tethering to other devices. Other input/output and control devices may be used.

Memory interface 602 may be coupled to memory 650. Memory 650 may include high-speed random access memory or non-volatile memory, such as one or more magnetic disk storage devices, one or more optical storage devices, or flash memory (e.g., NAND, NOR). Memory 650 may store operating system 652, such as Darwin, RTXC, LINUX, UNIX, OS X, iOS, WINDOWS, or an embedded operating system such as VxWorks. Operating system 652 may include instructions for handling basic system services and for performing hardware dependent tasks. In some embodiments, operating system 652 may include a kernel (e.g., UNIX kernel).

Memory 650 may also store communication instructions 654 to facilitate communicating with one or more additional devices, one or more computers or servers, including peer-to-peer communications. Communication instructions 654 may also be used to select an operational mode or communication medium for use by the device, based on a geographic location (obtained by the GPS/Navigation instructions 668) of the device.

Memory 650 may include graphical user interface instructions 656 to facilitate graphic user interface processing, including a touch model for interpreting touch inputs and gestures; sensor processing instructions 658 to facilitate sensor-related processing and functions; phone instructions 660 to facilitate phone-related processes and functions; electronic messaging instructions 662 to facilitate electronic-messaging related processes and functions; web browsing instructions 664 to facilitate web browsing-related processes and functions; media processing instructions 666 to facilitate media processing-related processes and functions; GNSS/Navigation instructions 668 to facilitate GNSS (e.g., GPS, GLOSSNAS) and navigation-related processes and functions; camera instructions 670 to facilitate camera-related processes and functions; and haptic engine instructions 672 for commanding or controlling haptic engine 617 and to provide the features and performing the processes described in reference to FIGS. 1-5.

Each of the above identified instructions and applications may correspond to a set of instructions for performing one or more functions described above. These instructions need not be implemented as separate software programs, procedures, or modules. Memory 650 may include additional instructions or fewer instructions. Furthermore, various functions of the device may be implemented in hardware and/or in software, including in one or more signal processing and/or application specific integrated circuits (ASICs). Software instructions may be in any suitable programming language, including but not limited to: Objective-C, SWIFT, C# and Java, etc.

While this document contains many specific implementation details, these should not be construed as limitations on the scope what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can, in some cases, be excised from the combination, and the claimed combination may be directed to a sub combination or variation of a sub combination. Logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A haptic engine comprising:
   a frame;
   a first coil and a second coil wound together around a common core, the first coil and the second coil being thermally coupled with each other and mechanically coupled with the frame, the first coil having first terminals and the second coil having second terminals;
   first driver circuitry electrically coupled with the first coil at the first terminals to drive a first driving current through the first coil;
   first voltage- and current-sensing circuitry electrically coupled with the first coil at the first terminals to sense a first driving voltage across, and the first driving current through, the first coil;
   second driver circuitry electrically coupled with the second coil at the second terminals to drive a second driving current through the second coil, wherein
      the first driving current and the second driving current have different values, and
      an increase of the first current is different from a decrease of the second current;
   second voltage- and current-sensing circuitry electrically coupled with the second coil at the second terminals to sense a second driving voltage across, and the second driving current through, the second coil;
   an attraction plate spaced apart from the first and the second coils through a gap, the attraction plate arranged to be driven relative to the frame along a driving direction to cause variation of the gap when the first driving current is driven through the first coil, and the second driving current is driven through the second coil; and
   computing circuitry configured to determine values of the gap between the attraction plate and the first and the second coils, the gap values determined
      independently of resistances of either the first coil or the second coil, and
      dependently of the first driving current through, and the first driving voltage across, the first coil, and the second driving current through, and the second driving voltage across, the second coil, and rates of change of the first and second driving currents.

2. The haptic engine of claim 1, wherein to determine the gap, the computing circuitry is configured to
   compute a first inductance of the first coil or a second inductance of the second coil, wherein each of the first inductance and the second inductance is computed independently of resistances of either the first coil or the second coil, and dependently of the first driving current through, and the first driving voltage over, the first coil, and the second driving current through, and the second driving voltage over, the second coil, and the rates of change of the first and second driving currents, and
   invert the first inductance of the first coil, or the second inductance of the second coil.

3. The haptic engine of claim 1, wherein the first driver circuitry and the second driver circuitry are configured to drive the first driving current through the first coil and the second driving current through the second coil with frequencies in a frequency range of 10 Hz to 5 kHz, preferably 300 Hz to 1 kHz.

4. The haptic engine of claim 1, wherein the first driver circuitry and the second driver circuitry are synchronized to drive the first driving current through the first coil and the second driving current through the second coil with the same frequency, and
   (i) when first and second coils are wound in the same direction, in phase relative to each other, or
   (ii) when first and second coils are wound in opposite directions, 180° -out-of-phase relative to each other.

5. The haptic engine of claim 1, comprising
   an integrated circuit, wherein the integrated circuit comprises
      the first driver circuitry comprising a first driving-current source to supply the first driving current through the first coil,
      the first voltage and current sensing circuitry comprising a first voltage sensor and a first current sensor to sense respective values of the first driving voltage across, and the first driving current through, the first coil,
      the second driver circuitry comprising a second driving-current source to supply the second driving current through the second coil, and
      the second voltage and current sensing circuitry comprising a second voltage sensor and a second current sensor to sense respective values of the second driving voltage across, and the second driving current through, the second coil.

6. The haptic engine of claim 1, comprising
an integrated circuit, wherein the integrated circuit comprises
the first driver circuitry comprising a first driving-voltage source to supply a first driving voltage across the first coil to induce the first driving current through the first coil,
the first voltage and current sensing circuitry comprising a first voltage sensor and a first current sensor to sense respective values of the first driving voltage across, and the first driving current through, the first coil,
the second driver circuitry comprising a second driving-voltage source to supply a second driving voltage across the second coil to induce the second driving current through the second coil, and
the second voltage and current sensing circuitry comprising a second voltage sensor and a second current sensor to sense respective values of the second driving voltage across, and the second driving current through, the second coil.

7. The haptic engine of claim 5 or 6, wherein the computing circuitry is coupled with
the first voltage/current sensing circuitry to receive respective values of the first driving voltage across, and the first driving current through, the first coil, and
the second voltage/current sensing circuitry to receive respective values of the second driving voltage across, and the second driving current through, the second coil.

8. The haptic engine of claim 5 or 6, wherein the integrated circuit is disposed either inside or outside the frame.

9. The haptic engine of claim 1, wherein the computing circuitry is disposed either inside or outside the frame.

10. A method for determining inductance of each winding of a coil with two windings wound together around a common core, the method comprising:
driving a first current through a first of the two windings;
driving a second current through a second of the two windings, wherein
the second current is different than the first current, and
an increase of the first current is different from a decrease of the second current;
sensing a first voltage across, and the first current through, the first winding;
sensing a second voltage across, and the second current through, the second winding; and
computing a first inductance the first winding or a second inductance of the second winding, wherein each of the first inductance and the second inductance is computed independently of resistances of either the first winding or the second winding, and
dependently of the first current through, and the first voltage over, the first winding, and the second current through, and the second voltage over, the second winding, and rates of change of the first and second currents.

11. The method of claim 10, wherein
driving the first current through the first of the two windings comprises supplying the first voltage across the first winding to induce the first current through the first winding,
driving the second current through the second of the two windings comprises supplying the second voltage across the second winding to induce the second current through the second winding.

12. The method of claim 10, wherein
driving the first current through the first of the two windings comprises supplying the first current through the first winding,
driving the second current through the second of the two windings comprises supplying the second current through the second winding.

13. The method of claim 10, comprising, when the first winding and the second winding are identical, computing the first inductance or the second inductance, in accordance with the following expression:

$$L_1 = L_2 = \frac{V_{drive_1} I_2 - V_{drive_2} I_1}{(I_2 - I_1)\left(\frac{dI_1}{dt} + \frac{dI_2}{dt}\right)}.$$

14. The method of claim 10, wherein the first current through the first winding and the second current through the second winding are driven with frequencies in a frequency range of 10 Hz to 5 kHz, preferably 300 Hz to 1 kHz.

15. The method of claim 10, comprising
synchronizing the driving of the first current through the first winding and the second current through the second winding, such that the first current and the second current are driven with the same frequency and
(i) when first and second coils are wound in the same direction, in phase relative to each other, or
(ii) when first and second coils are wound in opposite directions, 180° -out-of-phase relative to each other.

16. A haptic engine comprising:
a frame;
a double-wound driving coil that is mechanically coupled with the frame and comprises a first coil and a second coil wound together around a common core and thermally coupled with each other, the first coil and the second coil being connected in series and having a common terminal, wherein a first ratio $$N = \frac{R_1}{R_2}$$

of the resistances of the first coil and the second coil is different from the square root of a second ratio $$M = \frac{L_1}{L_2}$$

of the inductances of the first coil and the second coil;
driver circuitry electrically coupled with the first coil at a first terminal different from the common terminal, and the second coil at a second terminal different from the common terminal to drive a driving current through the first coil and the second coil, such that its rate of change is non-zero;
first voltage sensing circuitry to sense a first driving voltage across the first coil when electrically coupled with the first coil at the first terminal and the common terminal;
second voltage sensing circuitry to sense a second driving voltage across the second coil when electrically coupled with the second coil at the second terminal and the common terminal;
an attraction plate spaced apart from the first and the second coils through a gap, the attraction plate arranged to be driven relative to the frame along a driving direction to cause variation of the gap when the driving current is driven through the first coil and the second coil; and computing circuitry configured to determine values of the gap between the attraction plate and the first and the second coils, the gap values determined independently of resistances of either the first coil or the second coil, and dependently of the first driving voltage over the first coil and the second driving voltage over the second coil, the rate of change of the driving current through the first and second coils, and the first and second ratios.

17. The haptic engine of claim 16, wherein the first coil and the second coil have the same numbers of turns and different resistances.

18. The haptic engine of claim 16, wherein the first coil and the second coil have the same coil geometry, and are made from wire of the same material, and the first coil has a first gauge, and the second coil has a second gauge different from the first gauge.

19. The haptic engine of claim 16, wherein the first coil and the second coil have the same coil geometry and the same gauge, and the first coil is made from a first material, and the second coil is made from a second material different from the first material.

20. The haptic engine of claim 16, wherein to determine the gap, the computing circuitry is configured to compute a first inductance of the first coil or a second inductance of the second coil, wherein each of the first inductance and the second inductance is computed independently of resistances of either the first coil or the second coil, and dependently of the first driving voltage over the first coil, and the second driving voltage over the second coil, the rate of change of the driving current, and the first and second ratios, and invert the first inductance of the first coil, or the second inductance of the second coil.

21. The haptic engine of claim 16, wherein the driver circuitry is configured to drive the driving current through the first coil and the second coil with frequencies in a frequency range of 10 Hz to 5 kHz, preferably 300 Hz to 1 kHz.

22. The haptic engine of claim 16, comprising an integrated circuit comprising the driver circuitry comprising a driving-current source to supply the driving current through the first coil and the second coil, and a current sensor to sense the driving current, the first voltage sensing circuitry comprising a first voltage sensor, and the second voltage sensing circuitry comprising a second voltage sensor.

23. The haptic engine of claim 16, comprising an integrated circuit comprising the driver circuitry comprising a driving-voltage source to supply a driving voltage across the first coil and the second coil to induce the driving current through the first coil and the second coil, and a current sensor to sense the driving current.

24. The haptic engine of claim 22 or 23, wherein the integrated circuit is disposed either inside or outside the frame.

25. The haptic engine of claim 16, wherein the computing circuitry is disposed either inside or outside the frame.

26. The haptic engine of claim 22 or 23, wherein the computing circuitry is coupled with the first sensing circuitry to receive values of the first driving voltage across the first coil sensed by the first voltage sensing circuitry, and the second sensing circuitry to receive values of the second driving voltage across the second coil sensed by the second voltage sensing circuitry.

27. A method for determining inductance of each winding of a coil with two windings wound together around a common core, the two windings connected in series, wherein a first ratio $$N = \frac{R_1}{R_2}$$

of the resistances of a first of the two windings and second of the two windings is different from the square root of a second ratio $$M = \frac{L_1}{L_2}$$

of the inductances of the two windings, the method comprising:

driving a current through the two windings, such that its rate of change is non-zero;

sensing the current through the two windings;

sensing a first voltage across the first winding;

sensing a second voltage across the second winding; and computing a first inductance of the first winding or a second inductance of the second winding, wherein each of the first inductance and the second inductance is computed independently of resistances of either the first winding or the second winding, and dependently of the first driving voltage over the first winding and the second driving voltage over the second winding, the rate of change of the driving current through the two windings, and the first and second ratios.

28. The method of claim 27, wherein driving the current through the two windings comprises supplying a driving voltage across the two windings.

29. The method of claim 27, wherein driving the current through the two windings comprises supplying the current through the two windings.

30. The method of claim 27, wherein computing the first inductance or the second inductance is performed in accordance with the following expressions:

$$L_2 = \frac{V_{drive}\left(1 - N\frac{I_1}{I_2}\right)}{\left(\frac{dI_2}{dt} + \sqrt{M}\frac{dI_1}{dt}\right)\left(\sqrt{M} - N\frac{I_1}{I_2}\right)}, \text{ and}$$

$$L_1 = ML_2.$$

31. The method of claim 30, wherein computing the first inductance or the second inductance, when the first coil and the second coil have the same numbers of turns and different resistances, is performed in accordance with the following expressions:

$$L_1 = L_2 = \frac{NV_{drive_2} - V_{drive_1}}{2(N - I_1)\frac{dI}{dt}}.$$

32. The method of claim 27, wherein the current through the two windings is driven with frequencies in a frequency range of 10 Hz to 5 kHz, preferably 300 Hz to 1 kHz.

33. A haptic engine comprising:
a frame;
a double-wound driving coil that is mechanically coupled with the frame and comprises a first coil and a second coil wound together around a common core and thermally coupled with each other, the first coil and the second coil being connected in parallel at common terminals;
voltage-driver circuitry electrically coupled with the parallel-connected first coil and second coil to drive a driving voltage across the parallel-connected first coil and second coil, wherein the voltage driver circuitry comprises a voltage sensor electrically coupled with the parallel-connected first coil and second coil to sense the driving voltage across the parallel- connected first coil and second coil;
first current sensing circuitry electrically coupled with the first coil to sense a first driving current caused through the first coil by the driving voltage;
second current sensing circuitry electrically coupled with the second coil to sense a second driving current caused through the second coil by the driving voltage, wherein a first ratio $$\frac{I_1}{I_2}$$

of the first and second driving currents is different from a ratio of square root of a second ratio $$M = \frac{L_1}{L_2}$$

of the inductances of the first winding and the second winding and a third ratio $$N = \frac{R_1}{R_2}$$

of the resistances ot tne nrst winding and the second winding, and
an increase of the first current scaled by the square root of the first ratio is different from a decrease of the second current;
an attraction plate spaced apart from the first and the second coils through a gap, the attraction plate arranged to be driven relative to the frame along a driving direction to cause variation of the gap when the driving voltage is supplied across the parallel-coupled first coil and the second coil; and computing circuitry configured to determine a velocity of the mass along the driving direction, the velocity determined
independently of resistances of either the first coil or the second coil, and
dependently of the values of the driving voltage, rates of change of the first and second driving currents, and the first, second, and third ratios.

34. The haptic engine of claim 33, wherein the first coil and the second coil have the same numbers of turns and different resistances.

35. The haptic engine of claim 33, wherein
the first coil and the second coil have the same coil geometry, and are made from wire of the same material, and
the first coil has a first gauge, and the second coil has a second gauge different from the first gauge.

36. The haptic engine of claim 33, wherein
the first coil and the second coil have the same coil geometry and the same gauge, and
the first coil is made from a first material, and the second coil is made from a second material different from the first material.

37. The haptic engine of claim 33, wherein to determine the gap, the computing circuitry is configured to
compute a first inductance of the first coil or a second inductance of the second coil, wherein each of the first inductance and the second inductance is computed independently of resistances of either the first coil or the second coil, and dependently of the values of the driving voltage, the rates of change of the first and second driving currents, and the first, second, and third ratios, and
invert the first inductance of the first coil, or the second inductance of the second coil.

38. The haptic engine of claim 33, wherein the voltage-driver circuitry is configured to drive the driving voltage across the parallel-connected first coil and second coil with frequencies in a frequency range of 10 Hz to 5 kHz, preferably 300 Hz to 1 kHz.

39. The haptic engine of claim 33, comprising
an integrated circuit, wherein the integrated circuit comprises
the voltage-driver circuitry comprising a driving-voltage source to supply the driving voltage across the parallel-connected first coil and second coil,
the first sensing circuitry comprising a first current sensor, and
the second sensing circuitry comprising a second current sensor.

40. The haptic engine of claim 39, wherein the computing circuitry is coupled with
the voltage sensor to receive values of the driving voltage across the parallel-connected first coil and second coil,
the first current sensing circuitry to receive values of the first driving current through the first coil sensed by the first current sensor, and
the second current sensing circuitry to receive values of the second driving current through the second coil sensed by the second current sensor.

41. The haptic engine of claim 39, wherein the integrated circuit is disposed either inside or outside the frame.

42. The haptic engine of claim 33, wherein the computing circuitry is disposed either inside or outside the frame.

43. A method for determining inductance of each winding of a coil with two windings wound together around a common core, the two windings being connected in parallel, the method comprising:

supplying a driving voltage across the two parallel-connected windings;
sensing the driving voltage;
sensing a first current through the first winding;
sensing a second current through the second winding, wherein
a first ratio $$\frac{I_1}{I_2}$$

of the first and second driving currents is different from a ratio of square root of a second ratio $$M = \frac{L_1}{L_2}$$

of the inductances of the first winding and the second winding and a third ratio $$N = \frac{R_1}{R_2}$$

of the resistances of the first winding and the second winding, and
an increase of the first current scaled by the square root of the first ratio is different from a decrease of the second current; and
computing a first inductance of the first winding or a second inductance of the second winding, wherein each of the first inductance and the second inductance is computed
independently of resistances of either the first winding or the second winding, and
dependently of the values of the driving voltage, rates of change of the first and second driving currents, and the first, second, and third ratios.

44. The method of claim 43, wherein computing the first inductance or the second inductance is performed in accordance with the following expressions:

$$L_2 = \frac{V_{drive}\left(1 - N\frac{I_1}{I_2}\right)}{\left(\frac{dI_2}{dt} + \sqrt{M}\frac{dI_1}{dt}\right)\left(\sqrt{M} - N\frac{I_1}{I_2}\right)}, \text{ and}$$

$$L_1 = ML_2.$$

45. The method of claim 43, wherein the driving voltage across the two parallel-connected windings is supplied with frequencies in a frequency range of 10 Hz to 5 kHz, preferably 300 Hz to 1 kHz.

* * * * *